US011082895B2

(12) United States Patent
Liu et al.

(10) Patent No.: US 11,082,895 B2
(45) Date of Patent: Aug. 3, 2021

(54) SUBBAND SWITCHING METHOD, DEVICE, AND SYSTEM

(71) Applicant: HUAWEI TECHNOLOGIES CO., LTD., Guangdong (CN)

(72) Inventors: Yalin Liu, Shenzhen (CN); Guangzhu Zeng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/951,522

(22) Filed: Apr. 12, 2018

(65) Prior Publication Data

US 2018/0234896 A1 Aug. 16, 2018

Related U.S. Application Data

(63) Continuation of application No. PCT/CN2016/099447, filed on Sep. 20, 2016.

(30) Foreign Application Priority Data

Oct. 13, 2015 (CN) .......................... 201510670363.0

(51) Int. Cl.
H04W 36/00 (2009.01)
H04W 74/08 (2009.01)

(52) U.S. Cl.
CPC ....... H04W 36/0055 (2013.01); H04W 36/00 (2013.01); H04W 36/0016 (2013.01);
(Continued)

(58) Field of Classification Search
CPC ... H04L 5/0012; H04L 5/0057; H04L 5/0092; H04W 74/0833; H04W 36/30
See application file for complete search history.

(56) References Cited

U.S. PATENT DOCUMENTS 8,223,704 B2 7/2012 Hwang et al.
8,243,670 B2 8/2012 Chiu et al.
(Continued)

FOREIGN PATENT DOCUMENTS

CN 1994017 A 7/2007
CN 101521889 A 9/2009
(Continued)

OTHER PUBLICATIONS

"Channel Polarization: A Method for Constructing Capacity-Achieving Codes for Symmetric Binary-Input Memoryless Channels," Erdal Arikan et al.,IEEE Transactions on Information Theory, vol. 55, No. 7, Jul. 2009, total 23 pages.
"Filtered OFDM: A New Waveform for Future Wireless Systems," Javad Abdoli et al., 2015 IEEE 16th International Workshop on Signal Processing Advances in Wireless Communications (SPAWC), total 6 pages.
"Polar Codes for Cooperative Relaying," Ricardo Blasco-Serrano et al., IEEE Transactions on Communications, vol. 60, No. 11, Nov. 2012, total 11 pages.
(Continued)

Primary Examiner — Mansour Oveissi
(74) Attorney, Agent, or Firm — Leydig, Voit & Mayer, Ltd.

(57) ABSTRACT

The present application discloses a subband switching method, including: determining, by a network device, a target subband to which user equipment is to switch; sending, by the network device, identification information of the target subband to the user equipment; determining configuration information of the target subband according to the identification information of the target subband; and switching, by the user equipment, to the target subband according to the configuration information of the target subband. In the subband switching method provided in embodiments of the present application, switching between subbands can be implemented, so that when the UE has a subband switching requirement, the user equipment can be instructed to switch to a target subband. Therefore, service quality of the UE is improved.

27 Claims, 11 Drawing Sheets

(52) U.S. Cl.
CPC ... *H04W 36/0022* (2013.01); *H04W 36/0061* (2013.01); *H04W 36/0072* (2013.01); *H04W 36/0077* (2013.01); *H04W 74/0833* (2013.01)

(56) References Cited

U.S. PATENT DOCUMENTS

| | | | |
|---|---|---|---|
| 8,554,225 | B2 | 10/2013 | Kwon et al. |
| 10,797,918 | B2 | 10/2020 | Baldemair et al. |
| 2005/0272432 | A1 | 12/2005 | Ji et al. |
| 2010/0234037 | A1 | 9/2010 | Terry et al. |
| 2011/0250913 | A1* | 10/2011 | Vajapeyam ....... H04W 74/0833 455/507 |
| 2012/0014257 | A1 | 1/2012 | Ahluwalia et al. |
| 2012/0026980 | A1 | 2/2012 | Gao et al. |
| 2012/0281578 | A1* | 11/2012 | Hong ............... H04L 5/001 370/252 |
| 2013/0114566 | A1 | 5/2013 | Awoniyi et al. |
| 2015/0180622 | A1 | 6/2015 | Yoo et al. |
| 2016/0294595 | A1* | 10/2016 | Harada ............ H04L 27/2646 |
| 2017/0272322 | A1* | 9/2017 | You ................ H04L 41/0853 |
| 2018/0191483 | A1* | 7/2018 | Yamazaki ............ H04L 5/14 |

FOREIGN PATENT DOCUMENTS

| | | |
|---|---|---|
| CN | 101741798 A | 6/2010 |
| CN | 102215572 A | 10/2011 |
| CN | 102612133 A | 7/2012 |
| CN | 102647720 A | 8/2012 |
| EP | 2536235 A1 | 12/2012 |
| EP | 2996418 A1 | 3/2016 |
| WO | 2011097930 A1 | 8/2011 |
| WO | 2013082784 A1 | 6/2013 |
| WO | 2014111161 A1 | 7/2014 |
| WO | 2014205742 A1 | 12/2014 |
| WO | 2017005295 A1 | 1/2017 |

OTHER PUBLICATIONS

"3GPP TR 25.931 V12.0.0 (Sep. 2014), 3rd Generation Partnership Project; Technical Specification Group Radio Access Network; UTRAN functions, examples on signalling procedures (Release 12)," 3rd Generation Partnership Project, total 130 pages.
Extended European Search Report dated Jun. 13, 2018 in corresponding European Patent Application No. 16854861.8.
International Search Report dated Nov. 29, 2016 in corresponding International Patent Application No. PCT/CN2016/099447.
Written Opinion of the International Searching Authority dated Nov. 29, 2016 in corresponding International Patent Application No. PCT/CN2016/099447.
CN/201910575931.7, Office Action/Search Report, dated Dec. 3, 2020.
"E-UTRA Downlink Multiplexing and Control," 3GPP TSG-RAN WG1 LTE Ad Hoc, R1-060169, Helsinki, Finland, total 6 pages, 3rd Generation Partnership Project, Valbonne, France (Jan. 23-25, 2006).
"PUSCH for MTC UE," 3GPP TSG RAN WG1 Meeting #81, Fukuoka, Japan, R1-153250, total 4 pages, 3rd Generation Partnership Project, Valbonne, France (May 25-29, 2015).
"MTC narrow-band discussion and resource allocation design," 3GPP TSG RAN WG1 Meeting #81, Fukuoka, Japan, R1-153335, total 3 pages, 3rd Generation Partnership Project, Valbonne, France (May 25-29, 2015).
"Further Details on Narrowband Configuration for MTC UE," 3GPP TSG RAN WG1 Meeting #82bis, Malmo, Sweden, R1-155857, total 3 pages, 3rd Generation Partnership Project, Valbonne, France (Oct. 5-9, 2015).
U.S. Appl. No. 17/143,838, filed Jan. 7, 2021.

* cited by examiner

SUBBAND SWITCHING METHOD, DEVICE, AND SYSTEM

CROSS-REFERENCE TO RELATED APPLICATIONS

This application is a continuation of International Application No. PCT/CN2016/099447, filed on Sep. 20, 2016, which claims priority to Chinese Patent Application No. 201510670363.0, filed on Oct. 13, 2015, The disclosures of the aforementioned applications are hereby incorporated by reference in their entireties.

TECHNICAL FIELD

The present application relates to the field of communications technologies, and specifically, to a subband switching method, a device, and a system.

BACKGROUND

Filter orthogonal frequency division multiplexing (Filter Orthogonal Frequency Division Multiplex, "F-OFDM" for short) is a new communications technology. The F-OFDM technology divides a spectrum into multiple subbands. In the F-OFDM, a subband may be bandwidth that has a same subband parameter (numerology) or a set of subcarriers that have a same subband parameter. Each subband may include multiple subcarriers. Parameters (numerology) of different subbands may be the same or may be different. A subband parameter includes at least one of subcarrier bandwidth, a transmission time interval (TTI) length, a symbol length, a quantity of symbols, a cyclic prefix (CP) length, or the like. The subband parameter may be preconfigured or may be flexibly adapted according to service load. Different subbands may be used for different types of services.

User equipment ("UE" for short) executes a communication service on a subband. When the UE performs communication on a service subband, service quality may apparently change because of mobility of the UE, or service congestion may occur on the subband because a service volume of the subband used by the UE increases instantaneously. In the prior art, only switching between different network devices by user equipment is defined, but switching between different subbands by the user equipment is not defined.

SUMMARY

To resolve a prior-art problem that switching between different subbands by UE is not defined, embodiments of the present application provide a subband switching method, so that UE can switch to a different subband, and a current requirement of the UE is met. The embodiments of the present application further provide a corresponding device and system.

A first aspect of the present application provides a subband switching method, including:

determining, by a network device, a target subband to which user equipment is to switch; and sending, by the network device, identification information of the target subband to the user equipment, where the identification information of the target subband is used by the user equipment to determine configuration information of the target subband in order to switch to the target subband.

With reference to the first aspect, in a first possible implementation, the determining, by a network device, a target subband to which user equipment is to switch includes:

obtaining, by the network device, a subband measurement result of the user equipment; and determining, by the network device, the target subband according to the subband measurement result.

With reference to the first possible implementation of the first aspect, in a second possible implementation, the obtaining, by the network device, a subband measurement result of the user equipment includes:

sending, by the network device to the user equipment, information about a subband that the network device instructs to measure; and receiving, by the network device, signal quality that is sent by the user equipment and that is of the subband that the network device instructs to measure; and the determining, by the network device, the target subband according to the subband measurement result includes:

determining, by the network device, the target subband according to the signal quality.

With reference to the first possible implementation of the first aspect, in a third possible implementation, the obtaining, by the network device, a subband measurement result of the user equipment includes:

sending, by the network device, instruction information to the user equipment, where the instruction information is used to instruct the user equipment to send a reference signal on a subband designated by the network device; and determining, by the network device, signal quality of the designated subband according to the reference signal sent by the user equipment on the designated subband; and the determining, by the network device, the target subband according to the subband measurement result includes:

determining, by the network device, the target subband according to the signal quality.

With reference to the first possible implementation of the first aspect, in a fourth possible implementation, the obtaining, by the network device, a subband measurement result of the user equipment includes:

obtaining, by the network device, configuration information of a subband of a neighboring network device;

sending, by the network device, the configuration information of the subband of the neighboring network device to the user equipment; and receiving, by the network device, signal quality that is of the subband of the neighboring network device and that is sent by the user equipment; and the determining, by the network device, the target subband according to the subband measurement result includes:

determining, by the network device, the target subband according to the signal quality of the subband of the neighboring network device.

With reference to the fourth possible implementation of the first aspect, in a fifth possible implementation, the method further includes:

sending, by the network device, random access configuration information of the target subband to the user equipment, where the random access configuration information is used by the user equipment to perform random access to the target subband of the target network device.

With reference to the first aspect, in a sixth possible implementation, the determining, by a network device, a target subband to which user equipment is to switch includes:

obtaining, by the network device, a moving speed of the user equipment; and determining, by the network device, the target subband according to the moving speed of the user equipment.

With reference to the first aspect, in a seventh possible implementation, the determining, by a network device, a target subband to which user equipment is to switch includes:

determining the target subband according to a service type of the user equipment and/or service load of each subband.

A second aspect of the present application provides a subband switching method, including:

receiving, by user equipment, identification information that is of a target subband and that is sent by a network device;

determining, by the user equipment, configuration information of the target subband according to the identification information of the target subband; and switching, by the user equipment, to the target subband according to the configuration information of the target subband.

With reference to the second aspect, in a first possible implementation, before the receiving, by user equipment, identification information that is of a target subband and that is sent by a network device, the method further includes:

receiving, by the user equipment, information that is sent by the network device and that is about a subband that the network device instructs to measure;

determining, by the user equipment according to the information about the subband that the network device instructs to measure, signal quality of the subband that the network device instructs to measure; and sending, by the user equipment to the network device, the signal quality of the subband that the network device instructs to measure.

With reference to the second aspect, in a second possible implementation, before the receiving, by user equipment, identification information that is of a target subband and that is sent by a network device, the method further includes:

receiving, by the user equipment, instruction information sent by the network device; and sending, by the user equipment according to the instruction information, a reference signal on a subband designated by the network device, where the reference signal is used by the network device to determine signal quality, on the designated subband, of the user equipment.

With reference to the second aspect, in a third possible implementation, before the receiving, by user equipment, identification information that is of a target subband and that is sent by a network device, the method further includes:

receiving, by the user equipment, configuration information that is of a subband of a neighboring network device and that is sent by the network device;

determining, by the user equipment, signal quality of the subband of the neighboring network device according to the configuration information of the subband of the neighboring network device; and sending, by the user equipment, the signal quality of the subband of the neighboring network device to the network device.

With reference to the third possible implementation of the second aspect, in a fourth possible implementation, the method further includes:

receiving, by the user equipment, random access configuration information that is of the target subband of the target network device and that is sent by the network device; and performing, by the user equipment, random access to the target subband of the target network device according to the random access configuration information of the target subband.

With reference to the second aspect, in a fifth possible implementation, the target subband is determined by the network device according to a moving speed of the user equipment.

With reference to the second aspect, in a sixth possible implementation, the target subband is determined by the network device according to a service type of the user equipment and/or service load of each subband.

A third aspect of the present application provides a network device, including:

a processing unit, configured to determine a target subband to which user equipment is to switch; and a sending unit, configured to send identification information of the target subband determined by the processing unit to the user equipment, where the identification information of the target subband is used by the user equipment to determine configuration information of the target subband in order to switch to the target subband.

With reference to the third aspect, in a first possible implementation, the processing unit is specifically configured to: obtain a subband measurement result of the user equipment, and determine the target subband according to the subband measurement result.

With reference to the first possible implementation of the third aspect, in a second possible implementation, the network device further includes a receiving unit;

the sending unit is further configured to send, to the user equipment, information about a subband that the network device instructs to measure;

the receiving unit is configured to receive signal quality that is sent by the user equipment and that is of the subband that the network device instructs to measure; and the processing unit is specifically configured to determine the target subband according to the signal quality received by the receiving unit.

With reference to the first possible implementation of the third aspect, in a third possible implementation, the sending unit is further configured to send instruction information to the user equipment, where the instruction information is used to instruct the user equipment to send a reference signal on a subband designated by the network device; and the processing unit is configured to: determine signal quality of the designated subband according to the reference signal sent by the user equipment on the designated subband, and determine the target subband according to the signal quality.

With reference to the first possible implementation of the third aspect, in a fourth possible implementation, the network device further includes a receiving unit;

the receiving unit is configured to obtain configuration information of a subband of a neighboring network device;

the sending unit is further configured to send, to the user equipment, the configuration information that is of the subband of the neighboring network device and that is received by the receiving unit;

the receiving unit is further configured to receive signal quality that is of the subband of the neighboring network device and that is sent by the user equipment; and the processing unit is specifically configured to determine the target subband of the target network device according to the signal quality that is of the subband of the neighboring network device and that is received by the receiving unit.

With reference to the fourth possible implementation of the third aspect, in a fifth possible implementation, the sending unit is further configured to send random access configuration information of the target subband to the user equipment, where the random access configuration information is used by the user equipment to perform random access to the target subband of the target network device.

With reference to the third aspect, in a sixth possible implementation, the processing unit is specifically configured to: obtain a moving speed of the user equipment, and determine the target subband according to the moving speed of the user equipment.

With reference to the third aspect, in a seventh possible implementation, the processing unit is specifically configured to determine the target subband according to a service type of the user equipment and/or service load of each subband.

A fourth aspect of the present application provides user equipment, including:

a receiving unit, configured to receive identification information that is of a target subband and that is sent by a network device; and a processing unit, configured to: determine configuration information of the target subband according to the identification information that is of the target subband and that is received by the receiving unit, and switch to the target subband according to the configuration information of the target subband.

With reference to the fourth aspect, in a first possible implementation, the user equipment further includes a sending unit;

the receiving unit is further configured to receive information that is sent by the network device and that is about a subband that the network device instructs to measure;

the processing unit is further configured to determine, according to the information that is received by the receiving unit and that is about the subband that the network device instructs to measure, signal quality of the subband that the network device instructs to measure; and the sending unit is configured to send, to the network device, the signal quality that is determined by the processing unit and that is of the subband that the network device instructs to measure.

With reference to the fourth aspect, in a second possible implementation, the user equipment further includes a sending unit;

the receiving unit is further configured to receive instruction information sent by the network device; and the sending unit is further configured to send, according to the instruction information received by the receiving unit, a reference signal on a subband designated by the network device, where the reference signal is used by the network device to determine signal quality, on the designated subband, of the user equipment.

With reference to the fourth aspect, in a third possible implementation, the user equipment further includes a sending unit;

the receiving unit is further configured to receive configuration information that is of a subband of a neighboring network device and that is sent by the network device;

the processing unit is further configured to determine signal quality of the subband of the neighboring network device according to the configuration information that is of the subband of the neighboring network device and that is received by the receiving unit; and the sending unit is configured to send, to the network device, the signal quality that is of the subband of the neighboring network device and that is determined by the processing unit.

With reference to the third possible implementation of the fourth aspect, in a fourth possible implementation, the user equipment further includes a random access unit;

the receiving unit is further configured to receive random access configuration information that is of the target subband of the target network device and that is sent by the network device; and the random access unit is configured to perform random access to the target subband of the target network device according to the random access configuration information that is of the target subband and that is received by the receiving unit.

With reference to the fourth aspect, in a fifth possible implementation, the target subband is determined by the network device according to a moving speed of the user equipment.

With reference to the fourth aspect, in a sixth possible implementation, the target subband is determined by the network device according to a service type of the user equipment and/or service load of each subband.

A fifth aspect of the present application provides a wireless communications system, including a network device and user equipment, where the network device is the network device according to any one of the third aspect or the possible implementations of the third aspect; and the user equipment is the user equipment according to any one of the fourth aspect or the possible implementations of the fourth aspect.

In the prior art, switching between subbands in an F-OFDM system is not defined. In comparison, in the subband switching method provided in the embodiments of the present application, switching between subbands can be implemented, so that when the UE has a subband switching requirement, the user equipment can be instructed to switch to a target subband. Therefore, service quality of the UE is improved.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person skilled in the art may still derive other drawings from these accompanying drawings without creative efforts.

DESCRIPTION OF EMBODIMENTS

Figure 1:
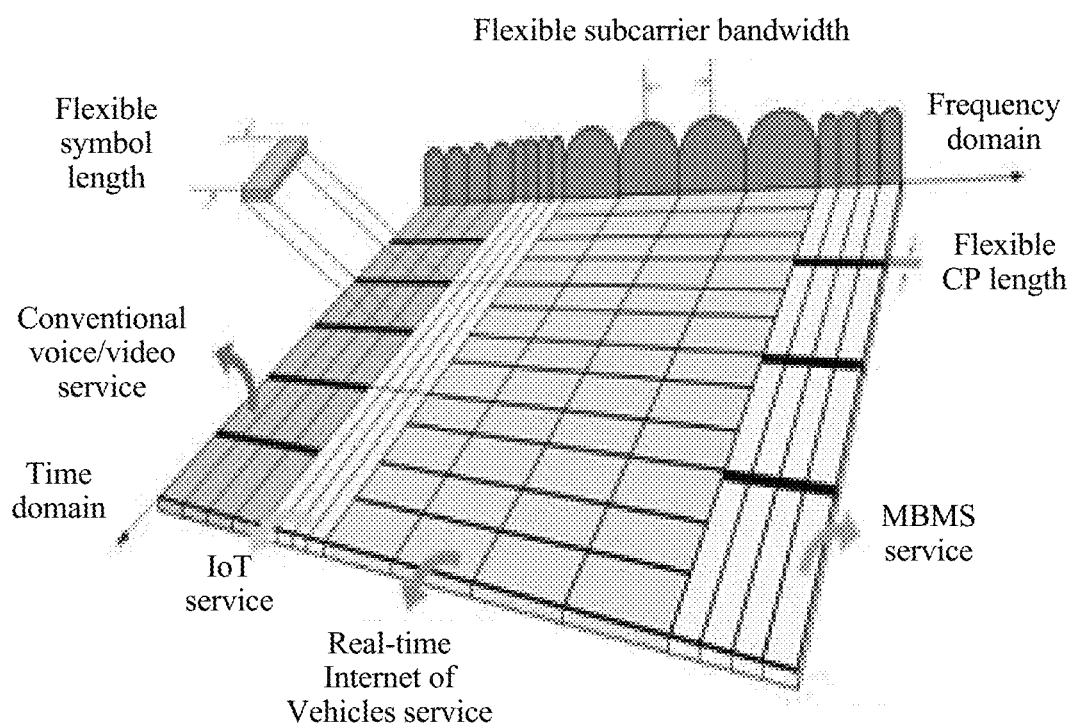
FIG. 1 is a schematic diagram of subband division of an F-OFDM system according to an embodiment of the present application.

The embodiments of the present application provide a subband switching method, so that user equipment can switch to a different subband, and a current service state of the user equipment is met. The embodiments of the present application further provide a corresponding device and system. The following separately provides detailed descriptions.

The following clearly describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

It should be understood that the technical solutions in the embodiments of the present application may be applied to various communications systems, such as a Global System for Mobile Communications (Global System of Mobile Communication, "GSM" for short) system, a Code Division Multiple Access ("CDMA" for short) system, a Wideband Code Division Multiple Access ("WCDMA" for short) system, a general packet radio service ("GPRS" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), a Worldwide Interoperability for Microwave Access ("WiMAX" for short) communications system, and a future 5G communications system.

A communications system to which the embodiments of the present application are applied includes user equipment and a network device.

The user equipment may communicate with one or more core networks by using a radio access network (RAN). The user equipment (UE for short) may be access user equipment, a subscriber unit, a subscriber station, a mobile station, a mobile, a remote station, remote user equipment, a mobile device, a wireless communications device, a user agent, or a user apparatus. The access user equipment may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device, another processing device connected to a wireless modem, an in-vehicle device, a wearable device, user equipment in a future 5G network, or the like.

The network device may be a device configured to communicate with the user equipment. For example, the network device may be a base transceiver station ("BTS" for short) in a GSM or CDMA system, or may be a NodeB ("NB" for short) in a WCDMA system, or may be an evolved NodeB (Evolutional Node B, "eNB" or "eNodeB" for short) in an LTE system; or the network device may be a relay station, an access point, an in-vehicle device, a wearable device, a network-side device in a future 5G network, a network device in a future evolved PLMN network, or the like.

For understanding of an F-OFDM solution in the embodiments of the present application, refer to FIG. 1. FIG. 1 is a schematic diagram of subband division of an F-OFDM system according to an embodiment of the present application. As shown in FIG. 1, a radio signal for communication between a network device and user equipment has a specific spectrum, the spectrum is divided into multiple subbands, and the subbands have different parameters (numerology). A subband parameter includes at least one of subcarrier bandwidth, a transmission time interval (TTI) length, a symbol length, a quantity of symbols, a cyclic prefix (CP) length, or the like. The subband parameter may be preconfigured or may be flexibly adapted according to service load. Generally, a subband configured by using each type of parameter is suitable for some specific types of services. For example, a conventional voice/video service, an Internet of Things (IOT) service, a real-time Internet of Vehicles service, and the Multimedia Broadcast Multicast Service (MBMS) are separately distributed on specific subbands. Low subcarrier bandwidth and a relatively high transmission delay are configured for a subband of the IOT service. This is of great significance for densely distributed IOT devices with low power consumption. Highest subcarrier bandwidth and a lowest transmission delay are configured for a subband of the real-time Internet of Vehicles service. That is, subbands may have different attributes, and basic physical layer parameters of the subbands whose attributes are different include at least one different parameter. For a specific division method, refer to FIG. 1, and details are not described herein.

Multiple subbands of one carrier generally include one common subband and multiple service subbands. The common subband is different from the service subbands, and is a subband initially accessed by user equipment, and a parameter configuration of the common subband is known to the user equipment. After the user equipment performs random access to the common subband, a network device usually switches the user equipment to the service subband for communication. Services of the user equipment are mainly carried on the service subband.

The subband division of the F-OFDM system in this embodiment of the present application may be preconfigured, configured semi-statically, or implemented dynamically.

In the embodiments of the present application, the multiple subbands may have different attributes, and basic physical layer parameters of all subbands in the multiple subbands whose attributes are different include at least one different parameter. The basic physical layer parameters may include a TTI length, a symbol length, a quantity of symbols, a CP length, and the like.

Figure 2:
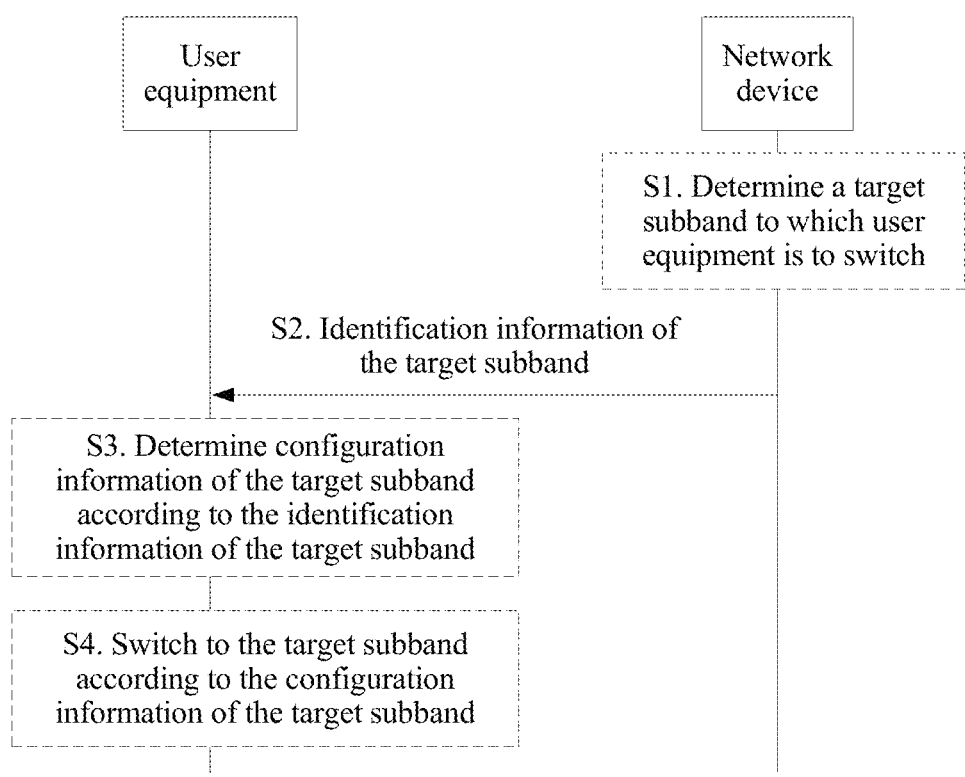
FIG. 2 is a schematic diagram of an embodiment of a subband switching method according to an embodiment of the present application.

FIG. 2 is a schematic diagram of an embodiment of a subband switching method according to an embodiment of the present application.

As shown in FIG. 2, the embodiment of the subband switching method in the embodiments of the present application includes the following steps.

S1. A network device determines a target subband to which user equipment is to switch.

S2. The network device sends identification information of the target subband to the user equipment.

The identification information of the subband may be a subband identity or a subband type identity.

S3. The user equipment determines configuration information of the target subband according to the identification information of the target subband.

The configuration information of the subband is used by the user equipment or the network device to locate and use the subband. The configuration information of the subband may include information, which is currently configured in a system, about each subband, for example, a location, bandwidth, and a basic physical layer parameter. The basic physical layer parameter may include at least one of a TTI length, a symbol length, a quantity of symbols, a CP length, or the like. An association relationship has been established between configuration information of a subband and identification information of the subband in advance. Therefore, the configuration information of the target subband may be determined according to the identification information of the subband and the association relationship.

S4. The user equipment switches to the target subband according to the configuration information of the target subband.

In the prior art, switching between subbands in an F-OFDM system is not defined. In comparison, in the subband switching method provided in this embodiment of the present application, switching between subbands can be implemented, so that when the UE has a subband switching requirement, the user equipment can be instructed to switch to a target subband. Therefore, service quality of the UE is improved.

Figure 3:
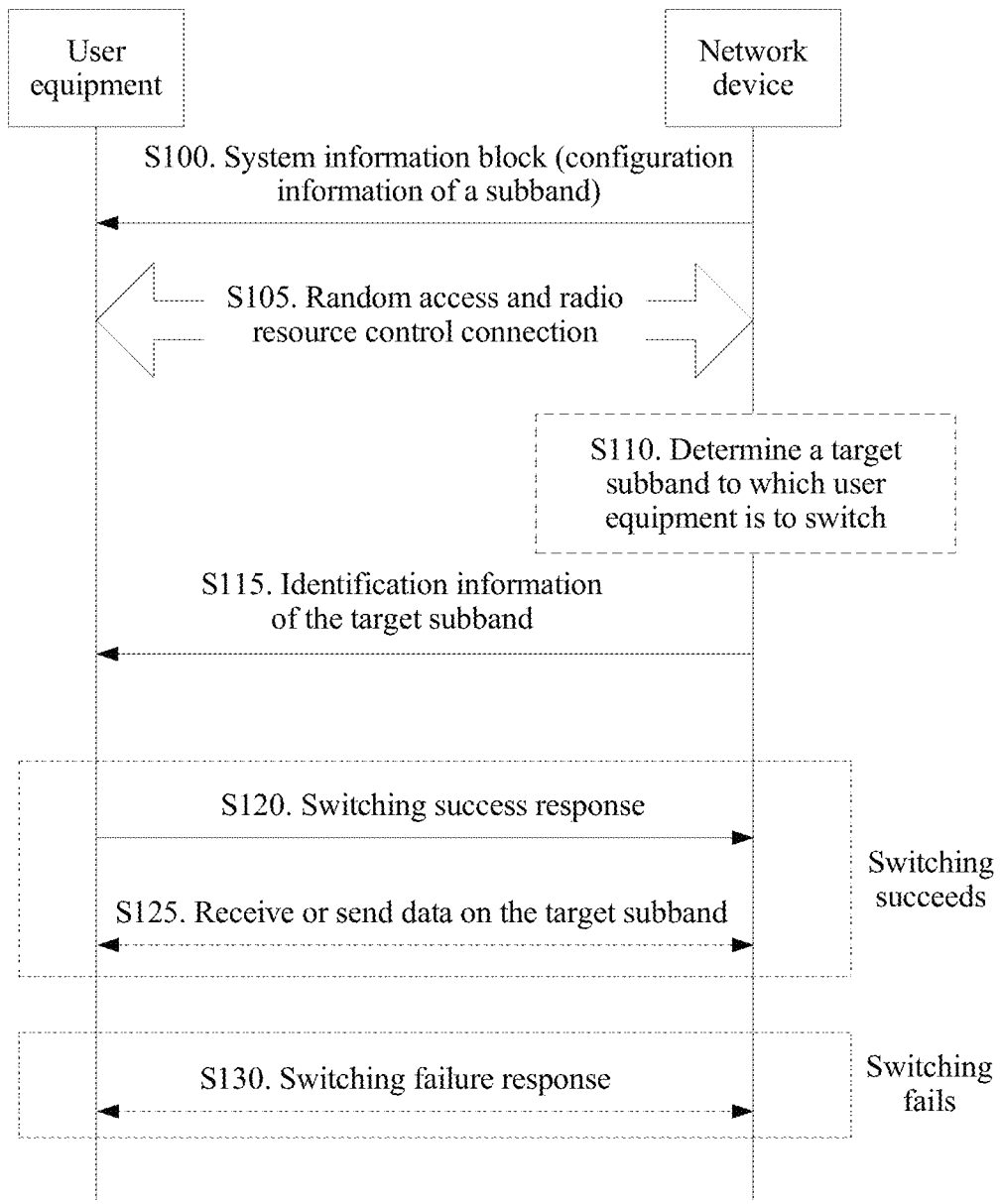
FIG. 3 is a schematic diagram of another embodiment of a subband switching method according to an embodiment of the present application.

FIG. 3 is a schematic diagram of an embodiment of a subband switching method according to an embodiment of the present application.

As shown in FIG. 3, the embodiment of the subband switching method in the embodiments of the present application includes the following steps.

S100. A network device sends a system information block ("SIB" for short) by using a periodical system broadcast message.

The SIB includes configuration information of each subband in an F-OFDM system.

Before using a service subband, user equipment obtains the SIB on a common subband, so as to obtain the configuration information of each subband. When the subband is used, specific waveform parameters of the subband, for example, a TTI, subcarrier space, and a cyclic prefix (CP) may be determined according to identification information of the subband.

S105. User equipment establishes a connection to a communications network by executing a random access process and a radio resource control ("RRC" for short) connection process.

A process in which the user equipment performs random access by using a random access channel (RACH) and the RRC connection process are the same as those in the prior art. Details are not described in this embodiment of the present application.

S110. The network device determines a target subband to which the user equipment is to switch.

S115. The network device sends identification information of the target subband to the user equipment.

The identification information of the target subband may be an identity of the target subband or a type identity of the target subband. Both the identity of the target subband and the type identity of the target subband may be represented by subBandIDs. The identification information of the target subband is used by the user equipment to determine the target subband in order to switch to the target subband.

The identification information of the target subband may be carried in an RRC connection reconfiguration message and sent to the user equipment, or certainly, may be carried in another message and sent to the user equipment. The message is not limited herein.

S120. When subband switching succeeds, the user equipment sends a switching success response message to the network device.

The switching success response message may be an RRC connection reconfiguration complete message.

S125. The user equipment and the network device use the target subband to receive and send data.

S130. When subband switching fails, the user equipment sends a switching failure response message to the network device.

The switching failure response message may be an RRC connection re-establishment message.

An RRC reconfiguration process may fail. For example, the user equipment does not support the target subband, or an RRC reconfiguration complete indication sent by the user equipment on the target subband is not received by the network device within a specified time. The user equipment and the network device maintain a timer. If a next response is not received within a time specified by the timer, an RRC connection re-establishment process is triggered.

In the prior art, switching between subbands in the F-OFDM system is not defined. In comparison, in the subband switching method provided in this embodiment of the present application, switching between subbands can be implemented, so that when the UE has a subband switching requirement, the user equipment can be instructed to switch to a target subband. Therefore, service quality of the UE is improved.

In this embodiment of the present application, there may be multiple solutions for determining the target subband to which the user equipment is to switch. One of the solutions may be:

obtaining, by the network device, a subband measurement result of the user equipment; and determining, by the network device according to the subband measurement result, the target subband to which the user equipment is to switch.

There may be two solutions for a specific process of obtaining the subband measurement result of the user equipment.

Figure 4:
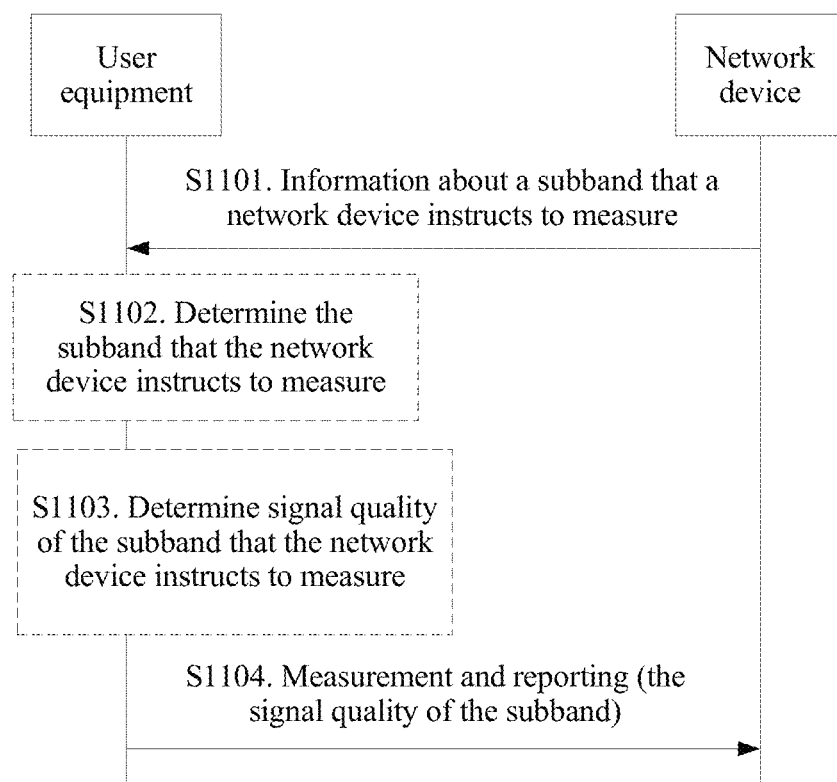
FIG. 4 is a schematic diagram of a subband according to an embodiment of the present application.

One solution is shown in FIG. 4. An embodiment in which the subband measurement result of the user equipment is obtained includes the following steps.

S1101. Send, to the user equipment, information about a subband that the network device instructs to measure.

The information about the subband that the network device instructs to measure may be carried in a measurement configuration message and sent to the user equipment, or may be carried in the RRC connection reconfiguration message and sent to the user equipment. The message is not limited herein.

The information about the subband that the network device instructs to measure may be such information as an identity, a location, or bandwidth of the subband that the network device instructs to measure.

In both S1101 and S115, the network device instructs, by using an RRC reconfiguration instruction, the user equipment to perform some actions. The RRC reconfiguration instruction may be used to deliver a measurement configuration (measurementConfiguration), may be used to configure a radio resource of the user equipment (radioResourceConfiguration), or may be used to instruct the user equipment to switch to another network device (mobilityControlInformation). In addition, these actions are usually performed simultaneously. For example, when the user equipment switches between network devices, the user equipment is instructed to perform radio resource configuration in a target network device at the same time when the user equipment is instructed to measure a signal of the target network device. The RRCConnectionReconfiguration is defined as follows for reference:

When the network device delivers the measurement configuration to the user equipment, the MeasurementConfiguration object in the RRCConnectionReconfiguration is not empty. The MeasurementConfiguration object is defined by using a MeasurementConfiguration structure. The MeasurementConfiguration includes configuration information MeasObjectFOFDM of a subband and a measurement report configuration ReportConfigFOFDM of the subband, and the network device instructs the user equipment to perform signal measurement on the subband. These structures are specifically defined as follows:

A MeasObjectFOFDM structure includes a subband identity or a subband type identity subBandID. The subBandID is one of all possible subband type identities. The subband type identity is defined in Table 1.

TABLE 1

Definition of a subband identity or a subband type identity

| SubBandID | TTI | Subcarrier space | Quantity of symbols | CP length |
|---|---|---|---|---|
| SB1 | 1 ms | 15 khz | — | — |
| SB2 | 0.5 ms | 30 khz | — | — |
| SB3 | 0.125 ms | 120 khz | — | — |
| SB4 | 3 ms | 15 khz | — | — |
| ... | ... | ... | ... | ... |

It can be learned from the foregoing table that subband parameters such as a TTI and subcarrier space can be determined by using a subBandID. Table 1 is described only as an example, and does not represent an actual parameter configuration of the system. Actually configured parameters may be different from these parameters. The network device instructs, by using a subBandID, the user equipment to measure a corresponding subband. A MeasObjectToAddModifyList may include multiple measurement objects MeasObjectFOFDM, and each measurement object corresponds to a measurement configuration of one subband. A ReportConfigToAddModifyList indicates a trigger condition for reporting a measurement report by the user equipment. The ReportConfigToAddModifyList includes multiple ReportConfigFOFDM objects. Each ReportConfigFOFDM object includes a subBandID of one subband and a trigger and configuration condition for reporting a measurement report of the subband. There may be various trigger conditions for reporting a measurement report of a subband. For example, a measurement report is reported when a subband with a strongest signal changes, or a measurement report is reported when signal strength of a subband reaches a threshold.

When a result of measurement performed by the user equipment on a designated measurement object MeasObjectFOFDM meets a trigger condition of a measurement report triggering configuration ReportConfigFOFDM, the user equipment reports the measurement report to the network device. The measurement report includes the measurement result MeasResultListFOFDM of the designated subband. The measurement result MeasResultListFOFDM is related to a subBandID.

When the network device instructs the user equipment to perform subband switching, a RadioResourceConfigDedicated object is not empty. A RadioResourceConfigDedicated structure includes a subBandID. The RadioResourceConfigDedicated structure is defined as follows.

Likewise, the subBandID is one of all possible subband identities or subband type identities.

In the method described in this embodiment, the network device instructs the user equipment to measure signal quality of a subband in F-OFDM and report a measurement report of signal quality of each subband, so that the network device can determine, according to the measurement report reported by the user equipment, a subband for communication by the user equipment, and instruct the user equipment to switch to the corresponding subband for communication. In this way, a user of the user equipment can perform communication on a subband with as highest signal quality as possible.

S1102. The user equipment determines, according to the information about the subband that the network device instructs to measure, the subband that the network device instructs to measure.

S1103. The user equipment determines, according to a reference signal on the subband that the network device instructs to measure, signal quality of the subband that the network device instructs to measure.

When performing communication transmission with each other, the network device and the user equipment do not know a transmission channel status in advance. A reference signal needs to be measured, so that the network device and the user equipment can know the channel status.

It is assumed that the network device has four subbands {SB1, SB2, SB3, SB4}, and when instructing the user equipment to perform measurement, the network device requires the user equipment to measure quality of reference signals on the four subbands {SB1, SB2, SB3, SB4} (or some of the four subbands) and report signal measurement results.

Figure 5:
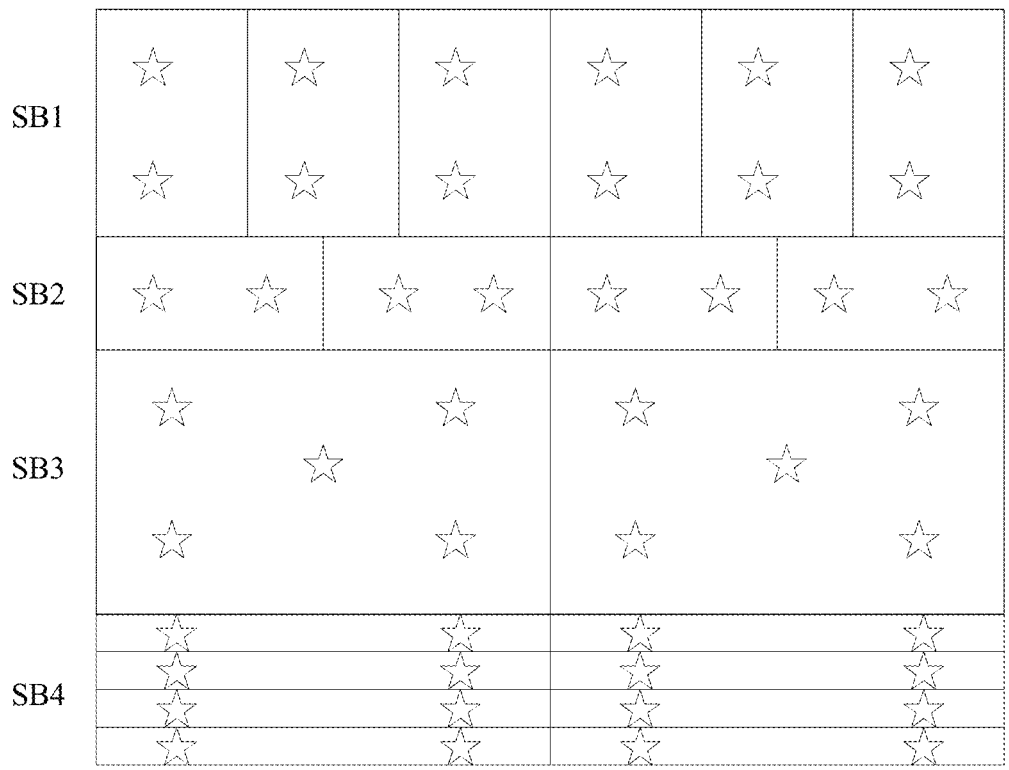
FIG. 5 is a schematic diagram of another embodiment of a subband switching method according to an embodiment of the present application.

As shown in FIG. 5, the reference signals on the subbands have various configurations because of a frame structure difference and a waveform parameter difference between the subbands. When measuring a subband, the user equipment needs to learn a configuration model of a reference signal on the subband according to a type of the subband, and then, can measure the subband according to a configuration status of the reference signal. Being limited by an antenna radio frequency capability, possibly, the user equipment can support only some subbands, for example, two subbands {SB2, SB3}. Therefore, the user equipment measures quality of reference signals only on the two subbands {SB2, SB3}, and a measurement report reported by the user equipment also includes channel quality results of only the two subbands {SB2, SB3}.

In this case, when sending a subband switching message to the user equipment, the network device performs configuration only from subbands included in a measurement result. In the foregoing example, the measurement report reported by the user equipment includes {SB2, SB3}. Therefore, the network device selects, from the two subbands, a subband for communication by the user equipment.

In addition, when performing subband resource configuration and scheduling, the network device also considers a service feature of the user equipment and/or occupation of an air interface resource of the network device. It is discovered, according to types of {SB2, SB3}, that a TTI of the SB2 is shorter and the SB2 is suitable for a user who requires a relatively low service delay. Apparently, a service that does not require a relatively low delay can be transmitted on the SB2. However, when all users contend for a resource of the SB2, transmission performance is quite poor because of congestion. The network device may schedule the service that does not require a relatively low delay onto the SB3. The SB3 may have relatively high bandwidth, and can support, according to a service transmission requirement of the user equipment, a user who has a quite high transmission capacity requirement, so as to ensure transmission experience of such a user.

S1104. The user equipment sends, to the network device, the signal quality of the subband that the network device instructs to measure, where the signal quality is used by the network device to determine the target subband.

Figure 6:
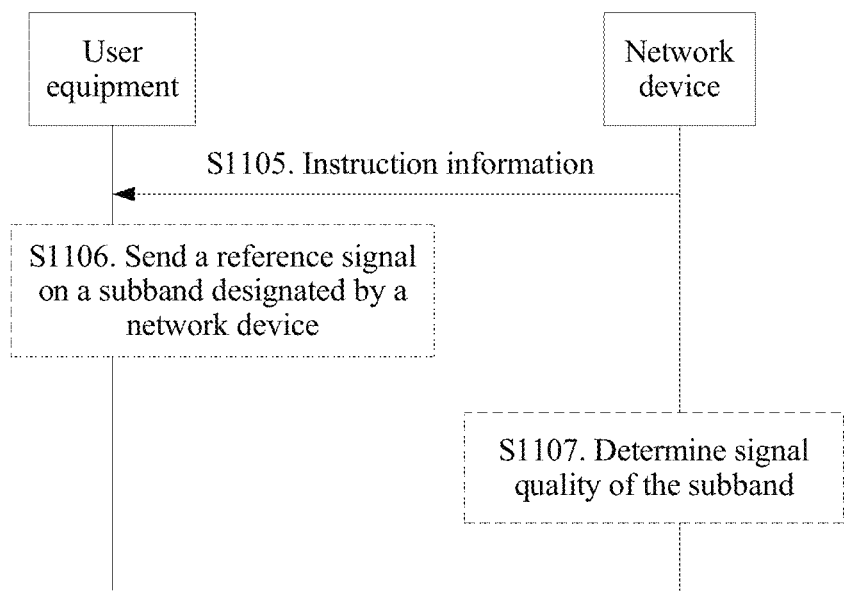
FIG. 6 is a schematic diagram of another embodiment of a subband switching method according to an embodiment of the present application.

A process in which the user equipment performs measurement and reporting is described in the embodiment corresponding to FIG. 4. Actually, the network device may alternatively measure signal quality. For a specific process, refer to FIG. 6. Another embodiment in which the subband measurement result of the user equipment is obtained includes the following steps.

S1105. The network device sends instruction information to the user equipment, where the instruction information is used to instruct the user equipment to send a reference signal on a subband designated by the network device.

The instruction information may be carried in a configuration message and sent to the user equipment, or may be carried in another message and sent to the user equipment.

S1106. The user equipment sends, according to the instruction information, the reference signal on the subband designated by the network device.

S1107. The network device determines signal quality of the designated subband according to the reference signal sent by the user equipment on the designated subband.

Another solution for determining the target subband to which the user equipment is to switch may be:
obtaining a moving speed of the user equipment; and
determining, according to the moving speed of the user equipment, the target subband to which the user equipment is to switch.

The network device may obtain the moving speed of the user equipment by using multiple methods. In one method, the user equipment may calculate the moving speed with assistance of a GPS positioning system, and then report the moving speed to the network device. In addition, alternatively, the user equipment may calculate the moving speed of the user equipment according to a path loss change of a received network device signal, and then report the moving speed to the network device. Alternatively, the network device may estimate the moving speed of the user equipment according to a change of a received user equipment signal.

The moving speed of the user equipment is decisive for subband selection. When the moving speed of the user equipment is relatively high, a communication signal is suitable to be transmitted on a subband with a short TTI. In this way, impact on transmission performance that is caused by a channel change in a unit time can be reduced. When the user equipment is static or moves at a low speed, a subband with a long TTI is configured, so that the user equipment can obtain a larger transmission capacity and higher transmission efficiency.

The network device may determine, according to the moving speed of the user equipment, whether to switch a subband for the user equipment. For example, when the moving speed of the user equipment is greater than a threshold, subband switching of the user equipment is triggered, so that the subband is switched to a subband with a short TTI and high bandwidth. When the moving speed of the user equipment is less than a threshold, subband switching of the user equipment is triggered, so that the subband is switched to a subband with a long TTI.

How the network device obtains the moving speed of the user equipment is not limited herein. There may be multiple levels of thresholds for determining the moving speed of the user equipment and the subband by the network device. For example, when the moving speed of the user equipment is 0-40 km/h, a TTI of the subband is 1 ms; when the moving speed of the user equipment is 40-80 km/h, a TTI of the subband is 0.5 ms; when the moving speed of the user equipment is 80-160 km/h, a TTI of the subband is 0.1 ms; or when the moving speed of the user equipment is greater than 160 km/h, a TTI of the subband is 0.05 ms.

The network device may determine an opportunity for subband switching of the user equipment according to another change criteria that is easy to obtain, in addition to a change of the moving speed of the user equipment. For example, the network device may detect a change of a transmission rate of a service type of the user equipment. When a transmission rate of the user equipment is less than a threshold, for example, when an Internet access transmission rate of the user equipment is less than 10 kbps, multiple user equipments communicate on a same subband. When the transmission rate of the user equipment is greater than the threshold, a subband may be set exclusively for the user equipment, or the user equipment may be scheduled onto a subband with relatively high bandwidth, so that the user equipment can perform communication transmission instantaneously exclusively, and therefore, instantaneous transmission experience of the user equipment is improved.

The foregoing describes switching between subbands of a same network device. Actually, the user equipment may move during communication. When a moving range falls beyond coverage of the network device, a communication service of the user equipment is switched from one network device eNB 1 to another network device eNB 2. Therefore, subband switching may be subband switching between different network devices.

Figure 7:
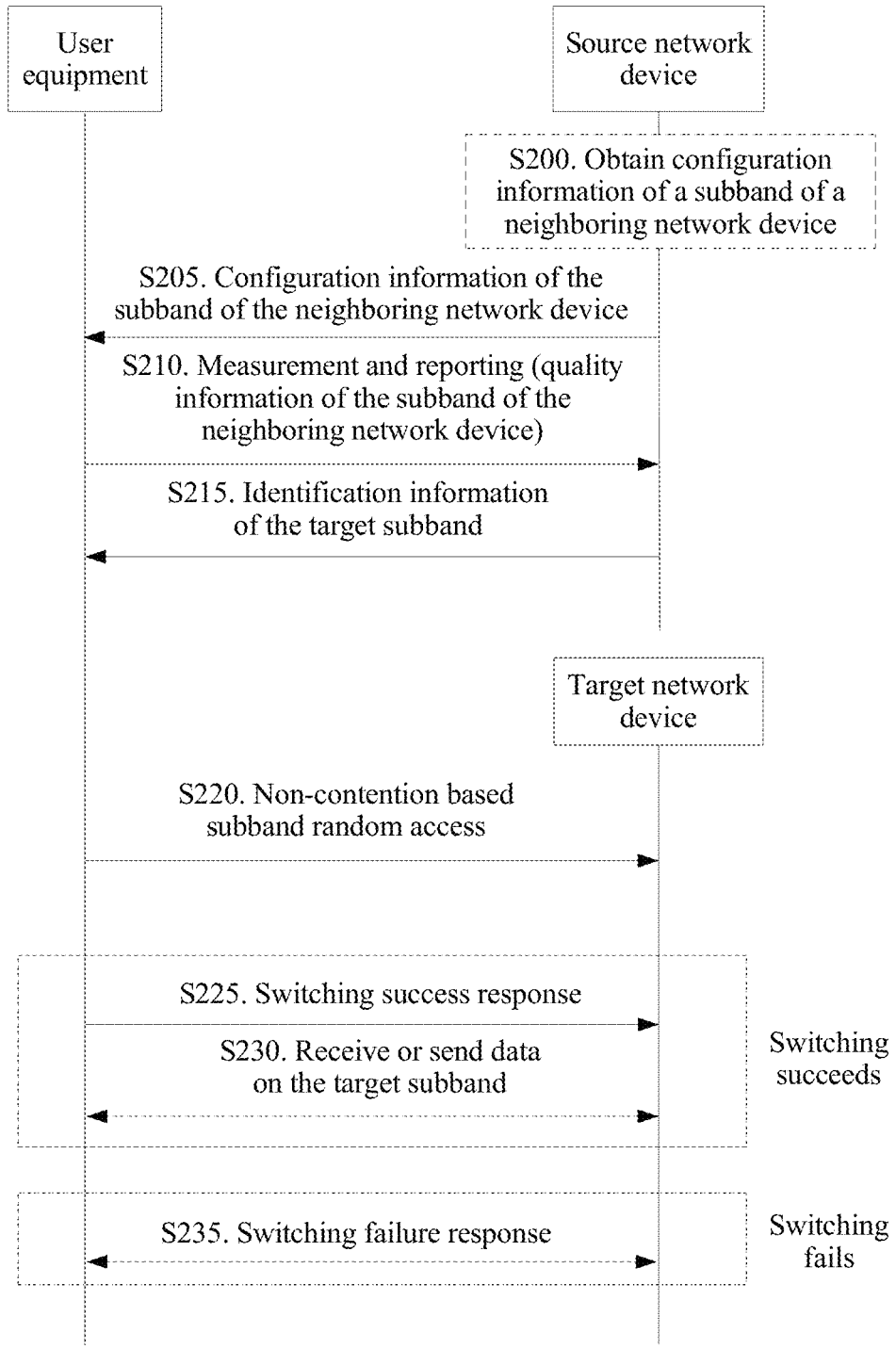
FIG. 7 is a schematic diagram of another embodiment of a subband switching method according to an embodiment of the present application.

Referring to FIG. 7, another embodiment of a subband switching method provided in an embodiment of the present application includes the following steps.

S200. A source network device obtains configuration information of a subband of a neighboring network device.

S205. The network device sends the configuration information of the subband of the neighboring network device to user equipment.

The configuration information may be carried in an RRC connection reconfiguration message and sent to the user equipment.

A difference from information about a subband that a network device instructs to measure in S1101 in FIG. 4 lies in that: configuration information of a subband of a neighboring cell is delivered herein while information about a subband of a local cell is delivered in S1101. In this embodiment of the present application, a structure definition of a MeasObjectFOFDM object further includes a list cellsToAddModifyList of the neighboring cell and a subBandID, so as to instruct to measure a signal of the subband of the neighboring cell. When a signal measurement instruction of the subband of the neighboring cell meets a trigger condition defined in ReportConfigFOFDM, reporting of a measurement result is triggered.

S210. The user equipment reports a measurement result of a subband signal of a neighboring cell.

Similar to the above, when measurement performed by the user equipment on a designated measurement object MeasObjectFOFDM meets a trigger condition of a measurement report triggering configuration ReportConfigFOFDM, the user equipment reports the measurement report to the network device. The measurement report includes the measurement result MeasResultListFOFDM of the designated subband of the neighboring cell. The measurement result MeasResultListFOFDM is related to a subBandID of the subband of the cell physicalCellIdentity.

The measurement result of the subband is signal quality of the subband.

S215. The network device delivers identification information of the target subband.

The source network device determines, according to the measurement report that is of the subband of the neighboring network device and that is reported by the user equipment, whether a network device switching condition is met. If the switching condition is met, the identification information of the target subband may be delivered by using the RRC connection reconfiguration message, to instruct the user equipment to switch to the target subband of the target network device. As described above, in an RRC connection reconfiguration, a mobilityControlInformation object is used to indicate information about network device switching reconfiguration that is caused by mobility of the user equipment. The mobilityControlInformation includes not only information about the target subband of the target network device but also random access configuration information of the subband of the target network device, so that the user equipment first performs non-contention-based random access to the subband of the target network device according to the random access configuration information, and then establishes an RRC connection to the subband according to the configuration information of the subband. A structure of the mobilityControlInformation object is defined as follows:

An objectSubBand includes information about the target subband of the target network device, for example, a frequency band, a subband identity, or a subband type identity, and rach-ConfigDedicated includes a temporarily dedicated random access resource of the target subband of the target network device.

In this embodiment, switching between network devices by the user equipment is described. To keep transmission experience consistent before and after switching, when the user equipment switches between network devices, the user equipment should switch to a subband of a same type as a source subband, at least a subband whose waveform parameter is relatively close to that of the source subband. If a TTI of a switched-from subband is 0.1 ms, a TTI of a switched-to subband may be 0.1 ms or less than 0.1 ms. If the user equipment switches to a subband whose TTI is 1 ms, a transmission delay possibly cannot meet a service requirement. Consequently, a service may fail.

S220. The user equipment performs random access to the target network device.

The RRC reconfiguration in S215 has indicated the random access configuration information of the target subband of the target network device, and the user equipment may directly perform random access to the target subband of the target network device. When the user equipment does not know the random access information of the subband, the user equipment needs to first perform random access to a common subband, and then switch to a service subband. Therefore, an access delay is excessively high, and service transmission experience is affected.

S225 to S235 are the same as S120 to S130. For understanding, refer to S120 to S130, and details are not described herein.

When configuration information of a subband of a network device changes, a neighboring network device of a cell may be notified of the configuration information of the subband of this network device by performing S205. A subband configuration of the network device may change in many cases. For example, if a subband is congested for a long time, the network device may extend bandwidth of the subband, so as to resolve a congestion and conflict problem; or a subband configuration may periodically change in some cells, for example, a subband is mainly configured to serve communication of intelligent user equipment in the daytime, but the subband is mainly configured to serve Internet of Things communication at night.

Configuration information of a subband may be notified between network devices in the following format:

A SubBandConfigList includes configuration information of a maximum quantity of subbands: maxSubBandConfig. Configuration information of each subband includes a subband identity subBandID, dl-Bandwidth, and ul-Bandwidth. A neighboring network device can determine subband information of the network device, for example, a subband TTI and a subcarrier spacing according to the subBandID. The dl-Bandwidth defines bandwidth of a downlink subband, and the ul-Bandwidth is valid only for an FDD mode, and defines bandwidth of an uplink subband in FDD. In a TDD mode, an uplink frequency band and a downlink frequency band are configured to be the same, and the configuration parameter ul-Bandwidth is not required.

In the method in this embodiment, when switching between network devices, the user equipment can directly switch to a subband whose attribute is the same as or close to that of an original subband used for communication, so that the user equipment is prevented from first accessing the common subband and then switching.

The present application provides a subband switching basis and the specific subband switching method. The network device can instruct the user equipment to measure the signal quality of the designated subband and report the measurement result, the network device can determine, according to the measurement result that is of the subband and that is reported by the user equipment, the identification information of the target subband when the user equipment switches between subbands or switches between network devices, and the user equipment can establish a service communication connection to an optimal subband and communicate, so that service transmission efficiency and experience are improved.

In this embodiment of the present application, subband switching means that the user equipment obtains configuration information of the target subband, so that the user equipment can communicate with the network device by using the target subband.

In addition, in this embodiment of the present application, when a target subband and a source subband before switching belong to a same network device, types of the target subband and the source subband are different. The network device performs scheduling between subbands of a same type without performing subband switching. To keep transmission experience consistent before and after switching, when a target subband and a source subband do not belong to a same network device, the user equipment should switch to a subband of a same type as the source subband, at least a subband whose waveform parameter is relatively close to that of the source subband.

Figure 8:
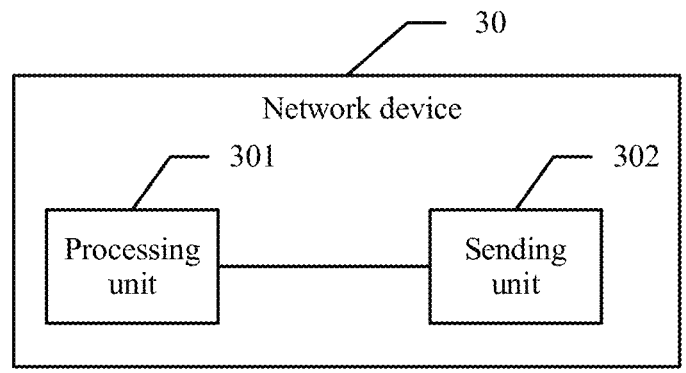
FIG. 8 is a schematic diagram of an embodiment of a network device according to an embodiment of the present application.

Referring to FIG. 8, an embodiment of a network device 30 provided in an embodiment of the present application includes:

a processing unit 301, configured to determine a target subband to which user equipment is to switch; and a sending unit 302, configured to send identification information of the target subband determined by the processing unit 301 to the user equipment, where the identification information of the target subband is used by the user equipment to determine configuration information of the target subband in order to switch to the target subband.

In the prior art, switching between subbands in an F-OFDM system is not defined. In comparison, according to the network device provided in this embodiment of the present application, switching between subbands can be implemented, so that when the UE has a subband switching requirement, the user equipment can be instructed to switch to a target subband. Therefore, service quality of the UE is improved.

Optionally, based on the embodiment corresponding to FIG. 8, in a first optional embodiment of the network device 30 provided in this embodiment of the present application, the processing unit 301 is specifically configured to: obtain a subband measurement result of the user equipment, and determine the target subband according to the subband measurement result.

Figure 9:
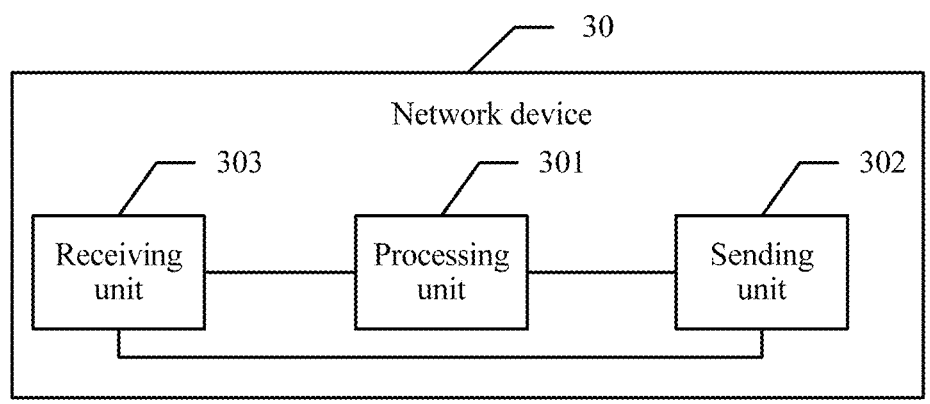
FIG. 9 is a schematic diagram of another embodiment of a network device according to an embodiment of the present application.

Optionally, based on the first optional embodiment of the network device, referring to FIG. 9, in a second optional embodiment of the network device 30 provided in this embodiment of the present application, the network device further includes a receiving unit 303.

The sending unit 302 is further configured to send, to the user equipment, information about a subband that the network device instructs to measure.

The receiving unit 303 is configured to receive signal quality that is sent by the user equipment and that is of the subband that the network device instructs to measure.

The processing unit 301 is specifically configured to determine the target subband according to the signal quality received by the receiving unit 303.

Optionally, based on the first optional embodiment of the network device 30, in a third optional embodiment of the network device 30 provided in this embodiment of the present application, the sending unit 302 is further configured to send instruction information to the user equipment, where the instruction information is used to instruct the user equipment to send a reference signal on a subband designated by the network device.

The processing unit 301 is specifically configured to: determine signal quality of the designated subband according to the reference signal sent by the user equipment on the designated subband, and determine the target subband according to the signal quality.

Optionally, based on the first optional embodiment of the network device 30, still referring to FIG. 9, in a fourth optional embodiment of the network device 30 provided in this embodiment of the present application, the receiving unit 303 is configured to obtain configuration information of a subband of a neighboring network device.

The sending unit 302 is further configured to send, to the user equipment, the configuration information that is of the subband of the neighboring network device and that is received by the receiving unit 303.

The receiving unit 303 is further configured to receive signal quality that is of the subband of the neighboring network device and that is sent by the user equipment.

The processing unit 301 is specifically configured to determine the target subband of the target network device according to the signal quality that is of the subband of the neighboring network device and that is received by the receiving unit 303.

Optionally, based on the fourth optional embodiment of the network device 30, in a fifth optional embodiment of the network device 30 provided in this embodiment of the present application, the sending unit 302 is further configured to send random access configuration information of the target subband to the user equipment, where the random access configuration information is used by the user equipment to perform random access to the target subband of the target network device.

Optionally, based on the embodiment corresponding to FIG. 8, in a sixth optional embodiment of the network device 30 provided in this embodiment of the present application, the processing unit 301 is specifically configured to: obtain a moving speed of the user equipment, and determine the target subband according to the moving speed of the user equipment.

Optionally, based on the embodiment corresponding to FIG. 8, in a seventh optional embodiment of the network device 30 provided in this embodiment of the present application, the processing unit 301 is specifically configured to determine the target subband according to a service type of the user equipment and/or service load of each subband.

For understanding of the embodiment or any optional embodiment of the network device, refer to descriptions of FIG. 1 to FIG. 7, and details are not described herein.

Figure 10:
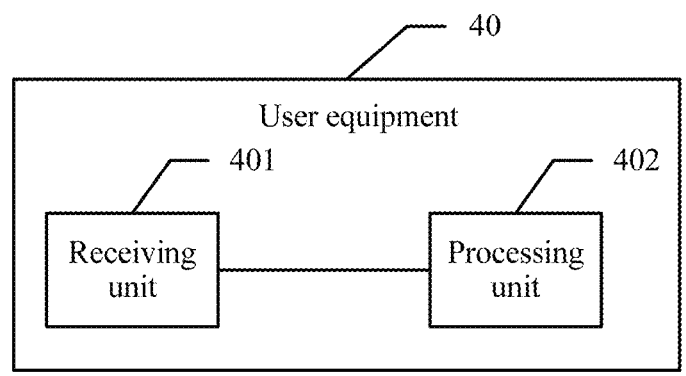
FIG. 10 is a schematic diagram of an embodiment of user equipment according to an embodiment of the present application.

Referring to FIG. 10, an embodiment of user equipment 40 provided in an embodiment of the present application includes:

a receiving unit 401, configured to receive identification information that is of a target subband and that is sent by a network device; and a processing unit 402, configured to: determine configuration information of the target subband according to the identification information that is of the target subband and that is received by the receiving unit 401, and switch to the target subband according to the configuration information of the target subband.

In the prior art, switching between subbands in an F-OFDM system is not defined. In comparison, the user equipment provided in this embodiment of the present application can switch between subbands, so that service quality of the UE is improved.

Figure 11:
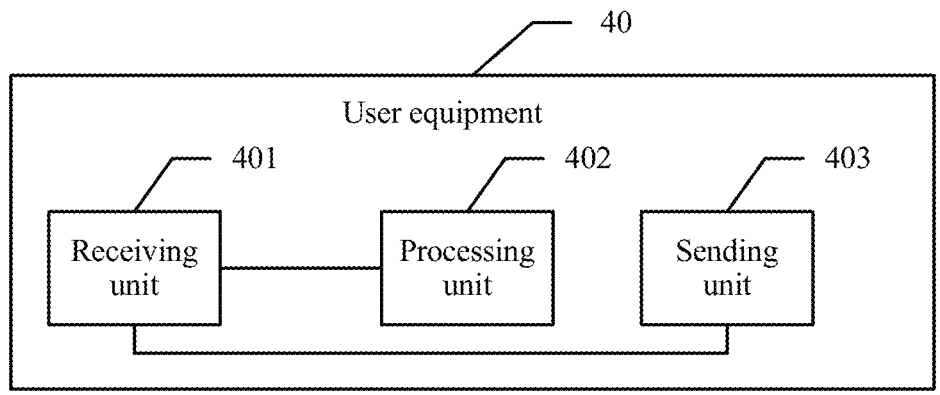
FIG. 11 is a schematic diagram of another embodiment of user equipment according to an embodiment of the present application.

Optionally, based on the embodiment corresponding to FIG. 10, referring to FIG. 11, in a first optional embodiment of the user equipment 40 provided in this embodiment of the present application, the user equipment further includes a sending unit 403.

The receiving unit 401 is further configured to receive information that is sent by the network device and that is about a subband that the network device instructs to measure.

The processing unit 402 is further configured to determine, according to the information that is received by the receiving unit 401 and that is about the subband that the network device instructs to measure, signal quality of the subband that the network device instructs to measure.

The sending unit 403 is configured to send, to the network device, the signal quality that is determined by the processing unit 402 and that is of the subband that the network device instructs to measure.

Optionally, based on the embodiment corresponding to FIG. 10, still referring to FIG. 11, in a second optional embodiment of the user equipment 40 provided in this embodiment of the present application, the receiving unit 401 is further configured to receive instruction information sent by the network device.

The sending unit 403 is further configured to send, according to the instruction information received by the receiving unit 401, a reference signal on a subband designated by the network device, where the reference signal is used by the network device to determine signal quality, on the designated subband, of the user equipment.

Optionally, based on the embodiment corresponding to FIG. 10, still referring to FIG. 11, in a third optional embodiment of the user equipment 40 provided in this embodiment of the present application, the receiving unit 401 is further configured to receive configuration information that is of a subband of a neighboring network device and that is sent by the network device.

The processing unit 402 is further configured to determine signal quality of the subband of the neighboring network device according to the configuration information that is of the subband of the neighboring network device and that is received by the receiving unit 401.

The sending unit 403 is further configured to send, to the network device, the signal quality that is of the subband of the neighboring network device and that is determined by the processing unit 402.

Figure 12:
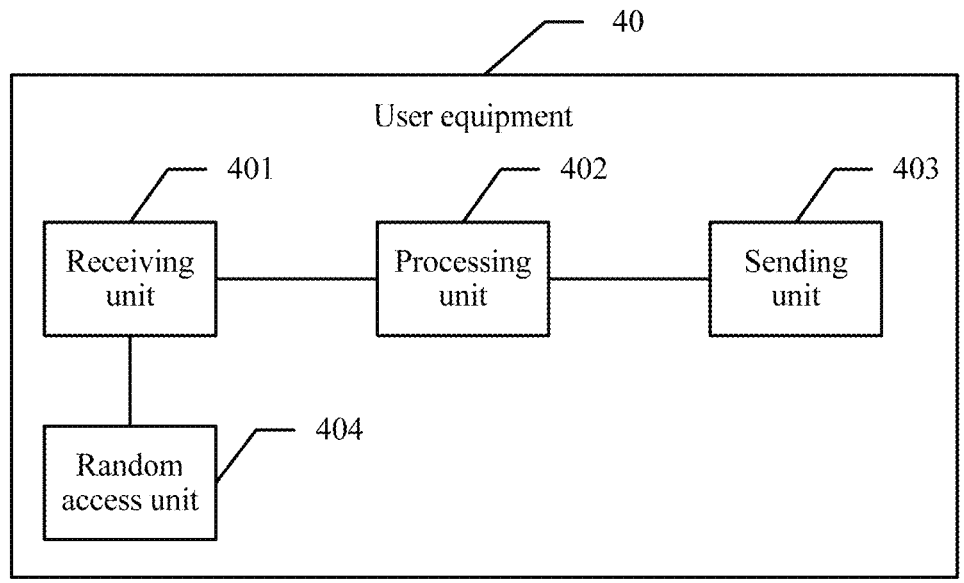
FIG. 12 is a schematic diagram of another embodiment of user equipment according to an embodiment of the present application.

Optionally, based on the third optional embodiment of the user equipment 40, referring to FIG. 12, in a fourth optional embodiment of the user equipment 40 provided in this embodiment of the present application, the user equipment further includes a random access unit 404.

The receiving unit 401 is further configured to receive random access configuration information that is of the target subband of the target network device and that is sent by the network device.

The random access unit 404 is configured to perform random access to the target subband of the target network device according to the random access configuration information that is of the target subband and that is received by the receiving unit 401.

Optionally, based on the embodiment corresponding to FIG. 10, in a fifth optional embodiment of the user equipment 40 provided in this embodiment of the present application, the target subband is determined by the network device according to a moving speed of the user equipment.

Optionally, based on the embodiment corresponding to FIG. 10, in a sixth optional embodiment of the user equipment 40 provided in this embodiment of the present application, the target subband is determined by the network device according to a service type of the user equipment and/or service load of each subband.

For understanding of the embodiment or any optional embodiment of the user equipment, refer to related descriptions of FIG. 1 to FIG. 7, and details are not described herein.

In the foregoing multiple embodiments, the receiving unit may be a receiver, the sending unit may be a transmitter, and the processing unit may be a processor.

In the foregoing multiple embodiments of the network device/the user equipment, it should be understood that, in one implementation, the receiving unit or the sending unit may be implemented by an input/output I/O device (such as a network interface card), and the processing unit may be implemented by a processor by executing a program or an instruction in a storage (in other words, the processing unit is implemented by both the processor and the special instruction in the storage coupled to the processor); in another implementation, the receiving unit or the sending unit may be implemented by an input/output I/O device (such as a network interface card), and the processing unit may be implemented by a dedicated circuit, where for a specific implementation, refer to the prior art, and details are not described herein; in still another implementation, the receiving unit or the sending unit may be implemented by an input/output I/O device (such as a network interface card), and the processing unit may be implemented by a field-programmable gate array (FPGA), where for a specific implementation, refer to the prior art, and details are not described herein. The present application includes but is not limited to the foregoing implementations. It should be understood that solutions implemented according to the ideas of the present application shall fall within the protection scope of the embodiments of the present application.

Figure 13:
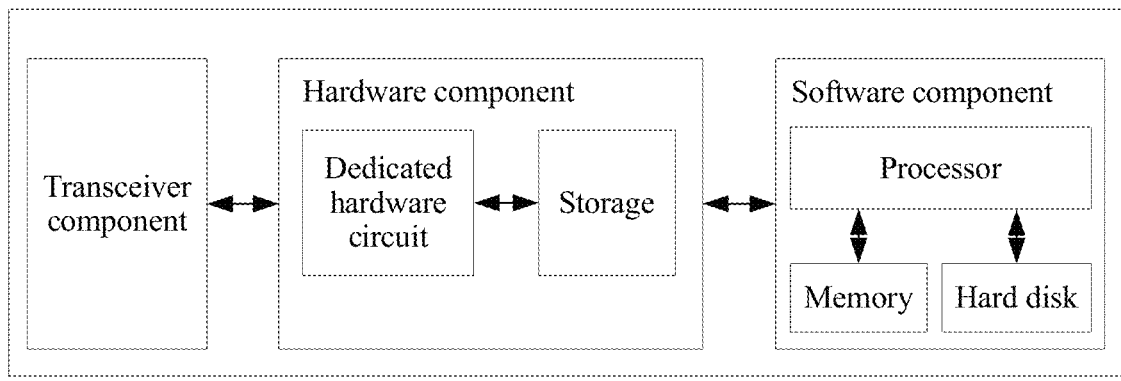
FIG. 13 is a schematic diagram of another embodiment of a network device/user equipment according to an embodiment of the present application.

An embodiment provides a hardware structure of a network device/user equipment. Referring to FIG. 13, the hardware structure of the network device/the user equipment may include:

three parts: a transceiver component, a software component, and a hardware component.

The transceiver component is a hardware circuit used for implementing packet reception and transmission.

The hardware component may also be referred to as a "hardware processing module", or may be more simply referred to as "hardware". The hardware component mainly includes a hardware circuit that implements some specific functions on the basis of a dedicated hardware circuit such as an FPGA or an ASIC (probably working with another accessory component such as a storage). Generally, a processing speed of the hardware component is much faster than that of a general-purpose processor. However, a function of the hardware component is difficult to change provided that the function is customized, and therefore, the hardware component is not flexibly implemented and is usually used for processing some fixed functions. It should be noted that, in an actual application, the hardware component may also include a processor such as an MCU (a microprocessor such as a single-chip microcomputer) or a CPU. However, a main function of these processors is not to implement processing of big data but to perform some control. In this application scenario, a system that includes these components is the hardware component.

The software component (or simply referred to as "software") mainly includes a general-purpose processor (such as a CPU) and some accessory components (for example, storage devices such as a memory and a hard disk). The processor may be configured with a corresponding processing function by means of programming. When the software is used for implementation, the software may be flexibly configured according to a service, but a speed of the software is generally slower than that of the hardware component. After the software completes processing, the hardware component may send processed data by using the transceiver component, or send processed data to the transceiver component by using an interface connected to the transceiver component.

In this embodiment, the transceiver component is configured to send information or receive information.

Other functions of the software component and the hardware component have been described in detail in the foregoing embodiment, and are not described herein.

With reference to the accompanying drawings, the following describes in detail the technical solutions in which the receiving unit or the sending unit may be an input/output I/O device (such as a network interface card), and the processing unit may be implemented by a processor by executing a program or an instruction in a storage.

Figure 14:
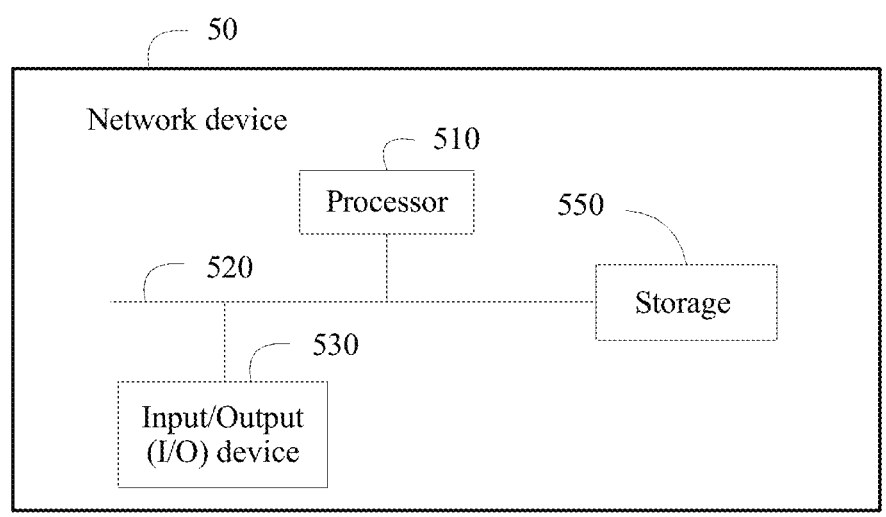
FIG. 14 is a schematic diagram of another embodiment of a network device according to an embodiment of the present application.

FIG. 14 is a schematic structural diagram of a network device 50 according to an embodiment of the present application. The network device 50 includes a processor 510, a storage 550, and an input/output I/O device 530. The storage 550 may include a read-only memory and a random access memory, and provide an operation instruction and data for the processor 510. A part of the storage 550 may further include a nonvolatile random access memory (NVRAM).

In some implementations, the storage 550 stores the following element: an executable module or a data structure, or a subset thereof, or an extended set thereof.

In this embodiment of the present application, by invoking the operation instruction stored in the storage 550 (the operation instruction may be stored in an operating system), the processor 510 performs the following operations:

determining a target subband to which user equipment is to switch; and sending identification information of the target subband to the user equipment by using the I/O device 530, where the identification information of the target subband is used by the user equipment to determine configuration information of the target subband in order to switch to the target subband.

In the prior art, switching between subbands in an F-OFDM system is not defined. In comparison, in the subband switching method provided in this embodiment of the present application, switching between subbands can be implemented, so that when the UE has a subband switching requirement, the user equipment can be instructed to switch to a target subband. Therefore, service quality of the UE is improved.

The processor 510 controls an operation of the network device 50, and the processor 510 may also be referred to as a CPU (central processing unit). The storage 550 may include a read-only memory and a random access memory, and provide an instruction and data for the processor 510. A part of the storage 550 may further include a nonvolatile random access memory (NVRAM). In a specific application, the components of the network device 50 are coupled together by using a bus system 520. In addition to a data bus, the bus system 520 may include a power bus, a control bus, a status signal bus, and the like. However, for clarity of description, various types of buses in the figure are marked as the bus system 520.

The method disclosed in the foregoing embodiment of the present application may be applied to the processor 510, or implemented by the processor 510. The processor 510 may be an integrated circuit chip and has a signal processing capability. In an implementation process, the steps of the foregoing methods may be performed by using an integrated logic circuit of hardware in the processor 510 or an instruction in a form of software. The processor 510 may be a general-purpose processor, a digital signal processor (DSP), an application-specific integrated circuit (ASIC), a field-programmable gate array (FPGA) or another programmable logic component, a discrete gate or a transistor logic component, or a discrete hardware component. The processor 510 may implement or execute the methods, steps, and logical block diagrams disclosed in the embodiments of the present application. The general-purpose processor may be a microprocessor, or the processor may be any conventional processor or the like. The steps of the methods disclosed with reference to the embodiments of the present application may be directly executed and completed by a hardware decoding processor, or may be executed and completed by a combination of hardware and a software module in a decoding processor. The software module may be located in a mature storage medium in the field, such as a random access memory, a flash memory, a read-only memory, a programmable read-only memory, an electrically-erasable programmable memory, or a register. The storage medium is located in the storage 550. The processor 510 reads information from the storage 550, and performs the steps of the foregoing methods in combination with hardware in the processor 510.

Optionally, the processor 510 is further configured to:

obtain a subband measurement result of the user equipment; and determine, according to the subband measurement result, the target subband to which the user equipment is to switch.

Optionally, the I/O device 530 is configured to: send, to the user equipment, information about a subband that the network device instructs to measure; and receive signal quality that is sent by the user equipment and that is of the subband that the network device instructs to measure.

The processor 510 is specifically configured to determine the target subband according to the signal quality.

Optionally, the I/O device 530 is configured to send instruction information to the user equipment, where the instruction information is used to instruct the user equipment to send a reference signal on a subband designated by the network device.

The processor 510 is specifically configured to determine signal quality of the designated subband according to the reference signal sent by the user equipment on the designated subband.

Optionally, the I/O device 530 is configured to: obtain configuration information of a subband of a neighboring network device; send the configuration information of the subband of the neighboring network device to the user equipment; and receive signal quality that is of the subband of the neighboring network device and that is sent by the user equipment.

The processor 510 is specifically configured to determine, according to the signal quality of the subband of the neighboring network device, the target subband that is of the target network device and to which the user equipment is to switch.

Optionally, the I/O device 530 is configured to send random access configuration information of the target subband to the user equipment, where the random access configuration information is used by the user equipment to perform random access to the target subband of the target network device.

Optionally, the processor 510 is specifically configured to: obtain a moving speed of the user equipment, and determine, according to the moving speed of the user equipment, the target subband to which the user equipment is to switch.

Optionally, the processor 510 is specifically configured to determine, according to a service type of the user equipment and/or service load of each subband, the target subband to which the user equipment is to switch.

Figure 15:
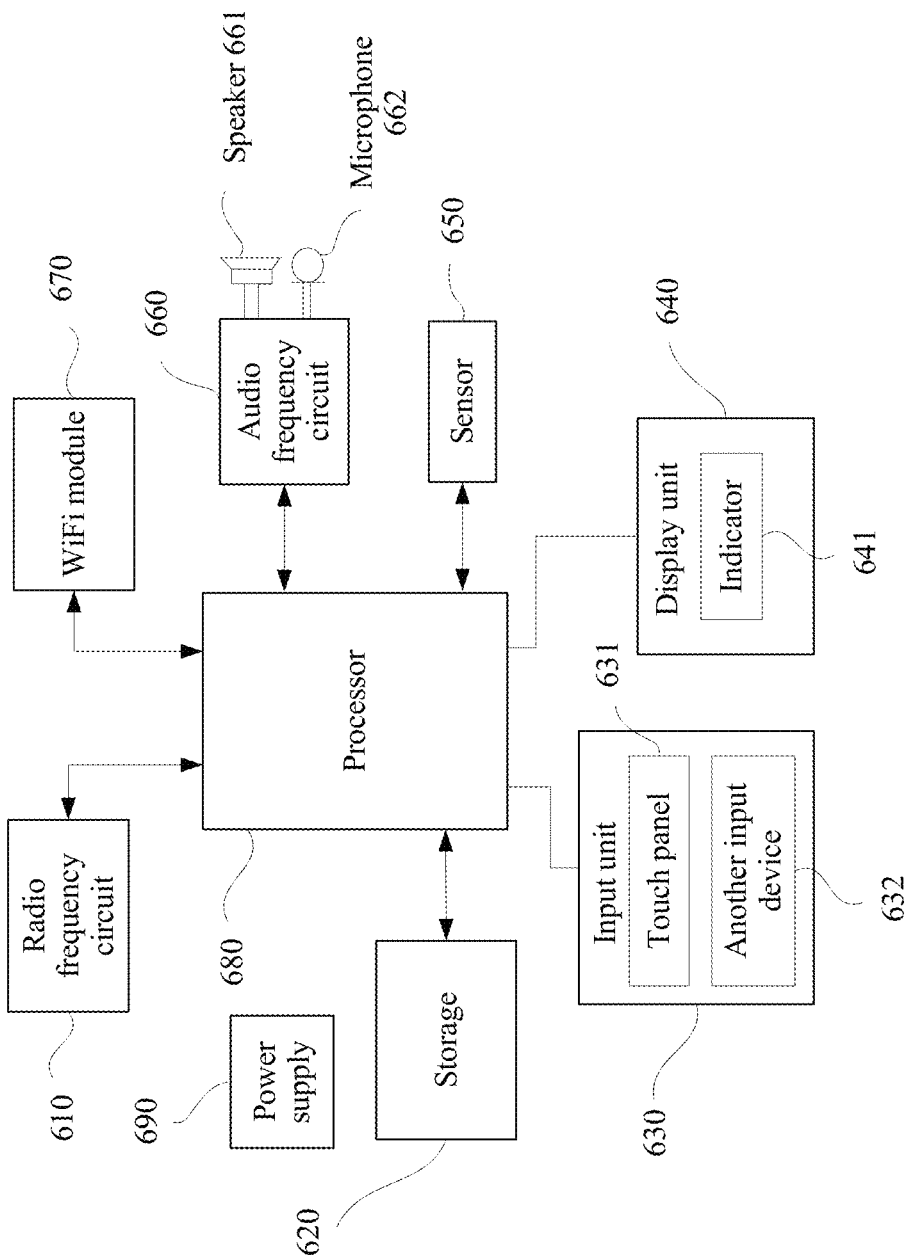
FIG. 15 is a schematic diagram of another embodiment of user equipment according to an embodiment of the present application.

FIG. 15 shows a block diagram of a partial structure of user equipment 60 according to an embodiment of the present application. Referring to FIG. 15, the user equipment includes parts such as a radio frequency circuit 610, a storage 620, an input unit 630, a display unit 640, a sensor 650, an audio frequency circuit 660, a WiFi module 670, a processor 680, and a power supply 690. A person skilled in the art may understand that the structure of the user equipment shown in FIG. 15 does not constitute a limitation on the user equipment, parts more or less than those shown in FIG. 15 may be included, some parts may be combined, or the parts may be arranged in a different way. The user equipment in this embodiment of the present application may be a terminal device such as a mobile phone.

The following describes the composition parts of the user equipment in detail with reference to FIG. 15.

The radio frequency circuit 610 may be configured to receive identification information that is of a target subband and that is sent by a network device.

The storage 620 may be configured to store a software program and a module, and the processor 680 executes various functional applications of the user equipment and performs data processing by running the software program and the module that are stored in the storage 620. The storage 620 may mainly include a program storage area and a data storage area. The program storage area may store an operating system, an application program (such as a sound play function or an image play function) that is required by at least one function, and the like; and the data storage area may store data (such as audio data or a phonebook) that is created according to use of the user equipment, and the like. In addition, the storage 620 may include a high-speed random access memory, and may further include a nonvolatile memory, such as at least one magnetic disk storage component, a flash memory component, or another volatile solid-state storage component.

The input unit 630 may be configured to: receive numerical or character information that is input, and generate key signal input related to a user setting and function control of the user equipment 60. Specifically, the input unit 630 may include a touch panel 631 and another input device 632. The touch panel 631, also referred to as a touchscreen, may collect a touch operation of a user on or near the touch panel 631 (for example, an operation performed by the user on the touch panel 631 or near the touch panel 631 by using any proper object or accessory such as a finger or a stylus), and drive corresponding connected user equipment according to a preset program. Optionally, the touch panel 631 may include two parts: touch detection user equipment and a touch controller. The touch detection user equipment detects a touch orientation of the user, detects a signal brought by a touch operation, and transfers the signal to the touch controller. The touch controller receives touch information from the touch detection user equipment, converts the touch information into contact coordinates, then sends the contact coordinates to the processor 680, and can receive and execute a command sent by the processor 680. In addition, the touch panel 631 may be implemented by using multiple types, such as a resistive type, a capacitive type, an infrared ray, and a surface acoustic wave. In addition to the touch panel 631, the input unit 630 may include the another input device 632. Specifically, the another input device 632 may include but is not limited to one or more of a physical keyboard, a function key (for example, a volume control key or an on/off key), a trackball, a mouse, a joystick, or the like.

The display unit 640 may be configured to display information that is input by the user or information provided for the user, and various menus of the user equipment. The display unit 640 may include an indicator 641. Optionally, the indicator 641 may be configured in a form such as a liquid crystal display (LCD) or an organic light-emitting diode (OLED). Further, the touch panel 631 may cover the indicator 641. After detecting a touch operation on or near the touch panel 631, the touch panel 631 transfers the touch operation to the processor 680, so that a type of a touch event can be determined, and then, the processor 680 provides corresponding visual output on the indicator 641 according to the type of the touch event. Although the touch panel 631 and the indicator 641 in FIG. 15 are used as two independent parts to implement input and input functions of the user equipment, in some embodiments, the touch panel 631 and the indicator 641 may be integrated to implement the input and output functions of the user equipment.

The user equipment 60 may further include at least one sensor 650.

The audio frequency circuit 660, a speaker 661, and a microphone 662 may provide an audio interface between the user and the user equipment. The audio frequency circuit 660 may transmit, to the speaker 661, an electrical signal converted from received audio data, and the speaker 661 converts the electrical signal into a sound signal for output. In addition, the microphone 662 converts a collected sound signal into an electrical signal, the audio frequency circuit 660 receives the electrical signal, converts the electrical signal into audio data, and then outputs the audio data to the processor 680 for processing, and then, the audio data is sent to, for example, another user equipment by using the radio frequency circuit 610, or the audio data is output to the storage 620 for further processing.

The processor 680 is a control center of the user equipment, is connected to various parts of the entire user equipment by using various interfaces and lines, executes various functions of the user equipment and performs data processing by running or executing the software program and/or the module stored in the storage 620 and by invoking data stored in the storage 620, so as to perform overall monitoring on the user equipment. Optionally, the processor 680 may include one or more processing units. An application processor and a modem processor may be integrated into the processor 680. The application processor mainly processes an operating system, a user interface, an application program, and the like, and the modem processor mainly processes wireless communication. It can be understood that the modem processor may not be integrated into the processor 680.

In this embodiment of the present application, the processor 680 is configured to: determine configuration information of the target subband according to the identification information of the target subband, and switch to the target subband according to the configuration information of the target subband.

The user equipment 60 further includes the power supply 690 (such as a battery) that supplies power to each part. Preferably, the power supply may be logically connected to the processor 680 by using a power supply management system, so as to implement functions such as management of charging, discharging, and power consumption by using the power supply management system.

The user equipment 60 may further include a camera, a Bluetooth module, and the like although they are not shown. Details are not described herein.

In this embodiment of the present application, the following may be further included.

Optionally, before the identification information that is of the target subband and that is sent by the network device is received, the method further includes:

the radio frequency circuit 610 is configured to receive information that is sent by the network device and that is about a subband that the network device instructs to measure.

The processor 680 is configured to determine, according to the information about the subband that the network device instructs to measure, signal quality of the subband that the network device instructs to measure.

The radio frequency circuit 610 is configured to send, to the network device, the signal quality of the subband that the network device instructs to measure.

Optionally, before the identification information that is of the target subband and that is sent by the network device is received, the method further includes:

the radio frequency circuit 610 is configured to: receive instruction information sent by the network device, and send, according to the instruction information, a reference signal on a subband designated by the network device, where the reference signal is used by the network device to determine signal quality, of the user equipment, on the designated subband.

Optionally, before the identification information that is of the target subband and that is sent by the network device is received, the method further includes:

the radio frequency circuit 610 is configured to receive configuration information that is of a subband of a neighboring network device and that is sent by the network device.

The processor 680 is configured to determine signal quality of the subband of the neighboring network device according to the configuration information of the subband of the neighboring network device.

The radio frequency circuit 610 is configured to send the signal quality of the subband of the neighboring network device to the network device.

Optionally, the radio frequency circuit 610 is further configured to receive random access configuration information that is of the target subband of the target network device and that is sent by the network device.

The processor 680 is configured to perform random access to the target subband of the target network device according to the random access configuration information of the target subband.

Optionally, the processor 680 is configured to determine a moving speed of the user equipment.

The target subband is determined by the network device according to the moving speed of the user equipment.

Optionally, before the identification information that is of the target subband and that is sent by the network device is received, the method further includes:

the target subband is determined by the network device according to a service type of the user equipment and/or service load of each subband.

Figure 16:
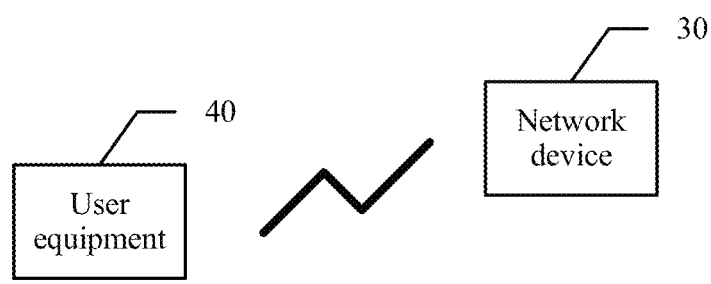
FIG. 16 is a schematic diagram of an embodiment of a wireless communications system according to an embodiment of the present application.

Referring to FIG. 16, an embodiment of a wireless communications system provided in an embodiment of the present application includes a network device 30 and user equipment 40.

The network device 30 is configured to: determine a target subband to which the user equipment is to switch, and send identification information of the target subband to the user equipment, where the identification information of the target subband is used by the user equipment to determine configuration information of the target subband in order to switch to the target subband.

The user equipment 40 is configured to: receive the identification information that is of the target subband and that is sent by the network device, determine the configuration information of the target subband according to the identification information of the target subband, and switch to the target subband according to the configuration information of the target subband.

In the prior art, switching between subbands in an F-OFDM system is not defined. In comparison, in the subband switching method provided in this embodiment of the present application, switching between subbands can be implemented, so that when the UE has a subband switching requirement, the user equipment can be instructed to switch to a target subband. Therefore, service quality of the UE is improved.

Optionally, the foregoing multiple optional embodiments in FIG. 1 to FIG. 7 can be all used as optional implementations of the wireless communications system in the present application. Details are not described herein.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

The subband switching method, the device, and the system provided in the embodiments of the present application are described in detail above. The principle and implementations of the present application are described by using specific examples in this specification. The description about the embodiments is merely intended to help understand the method and core ideas of the present application. In addition, a person of ordinary skill in the art can make various modifications and variations to the present application in terms of specific implementations and application scopes according to the ideas of the present application. In conclusion, the content of this specification shall not be construed as a limitation to the present application.

The invention claimed is:

1. A subband switching method comprising:
   determining, by a network device, a target subband of a target cell to which user equipment is to switch from a source subband of a source cell, wherein the target cell comprises one or more subbands; and
   sending, by the network device, identification information of the target subband to the user equipment,
      wherein the identification information of the target subband is associated with a configuration parameter that is of the target subband and that is usable for the user equipment to switch to the target subband, such that the configuration parameter of the target subband is known based on the identification information, and
      wherein the configuration parameter comprises a random access parameter and at least one of: a subcarrier space and a cyclic prefix (CP) length.

2. The method according to claim 1, wherein determining the target subband comprises determining the target subband according to signal quality, and the method further comprises:
   sending, by the network device to the user equipment, information about a subband that the network device indicates the user equipment to measure; and
   receiving, by the network device, signal quality of a reference signal sent on the subband measured by the user equipment.

3. The method according to claim 1, wherein determining the target subband of the target cell comprises determining the target subband according to signal quality of the subband of a neighboring network device, and the method further comprises:
   obtaining, by the network device, configuration information of a subband of the neighboring network device;
   sending, by the network device, the configuration information of the subband of the neighboring network device to the user equipment; and
   receiving, by the network device, signal quality of a reference signal sent on the subband of the neighboring network device from the user equipment.

4. The method according to claim 1, wherein the method further comprises: sending, by the network device, the configuration parameter of the target subband of the target cell to the user equipment.

5. A subband switching method comprising:
   receiving, by user equipment, identification information of a target subband of a target cell from a network device, wherein the target cell comprises one or more subbands;
   determining, by the user equipment, a configuration parameter of the target subband according to the identification information of the target subband,
      wherein the identification information is associated with the configuration parameter, such that the configuration parameter of the target subband is known based on the identification information; and
   switching, by the user equipment, to the target subband from a source subband of a source cell according to the configuration parameter of the target subband,
      wherein the configuration parameter comprises a random access parameter and at least one of: a subcarrier space and a cyclic prefix (CP) length.

6. The method according to claim 5, wherein before receiving, by the user equipment, the identification information of the target subband from the network device, the method further comprises:
   receiving, by the user equipment, information about a subband that the network device indicates the user equipment to measure;
   determining, by the user equipment according to the information about the subband that the network device indicates to measure, signal quality of a reference signal sent on the subband that the network device indicates to measure; and
   sending, by the user equipment to the network device, the signal quality of the reference signal sent on the subband that the network device indicates to measure.

7. The method according to claim 5, wherein before receiving the identification information of the target subband of the target cell from the network device, the method further comprises:
   receiving, by the user equipment, information from the network device designating a subband; and
   sending, by the user equipment according to the information, a reference signal on the subband designated by the network device, wherein the reference signal is usable for the network device to determine signal quality on the designated subband.

8. The method according to claim 5, wherein before receiving the identification information of the target subband of the target cell from the network device, the method further comprises:
   receiving, by the user equipment, configuration information of a subband of a neighboring network device from the network device;
   determining, by the user equipment, signal quality of a reference signal sent on the subband of the neighboring network device according to the configuration information of the subband of the neighboring network device; and
   sending, by the user equipment, the signal quality of the reference signal sent on the subband of the neighboring network device to the network device.

9. The method according to claim 5, wherein the method further comprises: receiving, by the user equipment, the configuration parameter of the target subband of the target cell from the network device.

10. The method according to claim 5, wherein the configuration parameter is comprised in configuration information.

11. A subband switching apparatus applied on a network side, the apparatus comprising at least one processor, wherein the at least one processor is configured to read an instruction in a memory and implement:
   determining a target subband of a target cell to which user equipment is to switch from a source subband of a source cell, wherein the target cell comprises one or more subbands; and
   causing a transmitter to send identification information of the target subband to the user equipment,
      wherein the identification information of the target subband is associated with a configuration parameter that is of the target subband and that is usable for the user equipment to switch to the target subband, such that the configuration parameter of the target subband is known based on the identification information, and wherein the configuration parameter comprises a random access parameter and at least one of: a subcarrier space and a cyclic prefix (CP) length.

12. The apparatus according to claim 11, wherein the at least one processor is configured to implement:
    causing the transmitter to send, to the user equipment, information about a subband that the apparatus indicates the user equipment to measure;
    causing a receiver to receive signal quality that is sent by the user equipment and that is of a reference signal sent on the subband that the apparatus indicates to measure; and
    determining the target subband according to the signal quality received by the receiver.

13. The apparatus according to claim 11, wherein the at least one processor is configured to implement:
    causing a receiver to obtain configuration information of a subband of a neighboring network device;
    causing the transmitter to send, to the user equipment, the configuration information that is of the subband of the neighboring network device and that is received by the receiver;
    causing the receiver to receive signal quality of a reference signal sent on the subband of the neighboring network device from the user equipment; and
    determining the target subband of a target network device according to the signal quality of the reference signal sent on the subband of the neighboring network device that is received by the receiver.

14. The apparatus according to claim 11, wherein the at least one processor is further configured to implement: causing the transmitter to send the configuration parameter of the target subband of the target cell to the user equipment.

15. The apparatus according to claim 11, wherein the configuration parameter is comprised in configuration information.

16. The apparatus according to claim 11, wherein the apparatus is a network device, a chip or a chip system.

17. A subband switching apparatus applied on a terminal side, the apparatus comprising at least one processor, wherein the at least one processor is configured to read an instruction in a memory and implement:
    causing a receiver to receive identification information of a target subband of a target cell from a network device, wherein the target cell comprises one or more subbands;
    determining a configuration parameter of the target subband according to the identification information of the target subband received by the receiver,
        wherein the identification information is associated with the configuration parameter, such that the configuration parameter of the target subband is known based on the identification information; and
    switching to the target subband from a source subband of a source cell, according to the configuration parameter of the target subband,
        wherein the configuration parameter comprises a random access parameter and at least one of: a subcarrier space and a cyclic prefix (CP) length.

18. The apparatus according to claim 17, wherein the at least one processor is further configured to implement:
    causing the receiver to receive, from the network device, information about a subband that the network device indicates the apparatus to measure;
    determining, according to the received information, a signal quality of a reference signal sent on the subband that the network device indicates the apparatus to measure; and
    causing a transmitter to send, to the network device, the signal quality of the reference signal sent on the subband that the network device indicates the apparatus to measure.

19. The apparatus according to claim 17, wherein the at least one processor is further configured to implement:
    causing the receiver to receive configuration information of a subband of a neighboring network device from the network device;
    determining signal quality of a reference signal sent on the subband of the neighboring network device according to the configuration information of the subband of the neighboring network device received by the receiver; and
    causing a transmitter to send, to the network device, the signal quality of the reference signal sent on the subband of the neighboring network device.

20. The apparatus according to claim 17, wherein the at least one processor is further configured to implement:
    causing the receiver to receive the configuration parameter of the target subband of the target cell network device from the network device.

21. The method according to claim 1, wherein the configuration parameter is comprised in configuration information.

22. The apparatus according to claim 17, wherein the configuration parameter is comprised in configuration information.

23. The apparatus according to claim 17, wherein the apparatus is a terminal device, a chip or a chip system.

24. A non-transitory computer-readable storage medium, storing a computer program, wherein when executing the program, a computer implements:
    receiving identification information of a target subband of a target cell from a network device, wherein the target cell comprises one or more subbands;
    determining a configuration parameter of the target subband according to the identification information of the target subband,
        wherein the identification information is associated with the configuration parameter, such that the configuration parameter of the target subband is known based on the identification information; and
    switching to the target subband from a source subband of a source cell, according to the configuration parameter of the target subband,
        wherein the configuration parameter comprises a random access parameter and at least one of: a subcarrier space and a cyclic prefix (CP) length.

25. The non-transitory computer-readable storage medium according to claim 24, wherein when executing the program, the computer further implements:
    receiving the configuration parameter of the target subband of the target cell from the network device.

26. A non-transitory computer-readable storage medium, storing a computer program, wherein when executing the program, a computer implements:
    determining a target subband of a target cell to which user equipment is to switch from a source subband of a source cell, wherein the target cell comprises one or more subbands; and
    sending identification information of the target subband to the user equipment, wherein the identification information of the target subband is associated with a configuration parameter that is of the target subband and that is usable for the user equipment to switch to the target subband, such that the configuration parameter of the target subband is known based on the identification information, and wherein the configuration parameter comprises a random access parameter and at least one of: a subcarrier space or a cyclic prefix (CP) length.

27. The non-transitory computer-readable storage medium according to claim 26, wherein when executing the program, the computer further implements: sending the configuration parameter of the target subband of the target cell to the user equipment.

* * * * *

UNITED STATES PATENT AND TRADEMARK OFFICE
CERTIFICATE OF CORRECTION

| | | |
|---|---|---|
| PATENT NO. | : 11,082,895 B2 | Page 1 of 1 |
| APPLICATION NO. | : 15/951522 | |
| DATED | : August 3, 2021 | |
| INVENTOR(S) | : Liu et al. | |

It is certified that error appears in the above-identified patent and that said Letters Patent is hereby corrected as shown below:

In the Claims

Claim 20: Column 30, Line 25: "of the target subband of the target cell network device from" should read -- of the target subband of the target cell from --.

Signed and Sealed this
Twentieth Day of September, 2022

Katherine Kelly Vidal
*Director of the United States Patent and Trademark Office*